US 8,407,074 B2

(12) United States Patent
Asanuma

(10) Patent No.: US 8,407,074 B2
(45) Date of Patent: Mar. 26, 2013

(54) GROUPING SYSTEM, GROUPING MANAGEMENT SERVER, AND GROUPING PROGRAM

(75) Inventor: Katsuhide Asanuma, Fujiyoshida (JP)

(73) Assignee: Fugaku Express Co., Ltd., Tsuru-Shi, Yamanashi (JP)

( * ) Notice: Subject to any disclaimer, the term of this patent is extended or adjusted under 35 U.S.C. 154(b) by 472 days.

(21) Appl. No.: 12/298,817

(22) PCT Filed: Mar. 30, 2007

(86) PCT No.: PCT/JP2007/057084
§ 371 (c)(1),
(2), (4) Date: Dec. 30, 2008

(87) PCT Pub. No.: WO2007/125721
PCT Pub. Date: Nov. 8, 2007

(65) Prior Publication Data
US 2009/0228329 A1 Sep. 10, 2009

(30) Foreign Application Priority Data

Apr. 28, 2006 (JP) .................................. 2006-124557

(51) Int. Cl.
*G06Q 10/00* (2012.01)
(52) U.S. Cl. ....................... 705/7.15; 705/7.13; 705/7.19
(58) Field of Classification Search ......... 705/7.11–7.42
See application file for complete search history.

(56) References Cited

U.S. PATENT DOCUMENTS

| 7,082,402 B2 * | 7/2006 | Conmy et al. ............... 705/7.19 |
| 7,415,424 B1 * | 8/2008 | Donner ........................... 705/5 |
| 7,551,930 B2 * | 6/2009 | Lempio et al. ............ 455/456.3 |
| 2002/0156787 A1 * | 10/2002 | Jameson et al. ................ 707/10 |

(Continued)

FOREIGN PATENT DOCUMENTS

| JP | 2000-276532 A | 10/2000 |
| JP | 2000-331284 A | 11/2000 |

(Continued)

OTHER PUBLICATIONS

"Amp'd Mobile and HurryDate to Bring Online Dating to Mobile Phones; Amp'd to End Dating Dry Spells with Exclusive Profiles and Mobile Connection to Leading Online and Events Community" (2005) Business Wire, p. 1.*

(Continued)

*Primary Examiner* — Johnna Loftis
*Assistant Examiner* — Sujay Koneru
(74) *Attorney, Agent, or Firm* — Buchanan Ingersoll & Rooney PC

(57) ABSTRACT

A group of participants taking part in an event is formed on the basis of intention of the participants. A grouping system includes a mobile terminal 3 having adjacent terminal communicating units 17, and a management server 1 for performing grouping. The management server 1 includes a member personal information database 51 for recording member ID information of the participants; an ID information combination database 52 for recording a combination of ID information obtained from another mobile terminal and ID information of itself; an event management database 53 for recording content of at least one event; an ID group management database 55 for registering an ID group; and group managing unit 67 for forming the ID group by linking ID information combinations having common ID information, recorded in the ID information combination database 52.

12 Claims, 24 Drawing Sheets

U.S. PATENT DOCUMENTS

| | | | |
|---|---|---|---|
| 2003/0020623 A1* | 1/2003 | Cao et al. | 340/686.6 |
| 2005/0227677 A1* | 10/2005 | Kallio | 455/414.3 |
| 2005/0272413 A1* | 12/2005 | Bourne | 455/415 |
| 2009/0164310 A1* | 6/2009 | Grossman | 705/10 |

FOREIGN PATENT DOCUMENTS

| | | |
|---|---|---|
| JP | 2002-230266 A | 8/2002 |
| JP | 2002-253724 A | 9/2002 |
| JP | 2004-171239 A | 6/2004 |
| JP | 2004-362054 A | 12/2004 |
| JP | 2005-295272 A | 10/2005 |
| JP | 2005-310062 A | 11/2005 |
| JP | 2005-350232 A | 12/2005 |

OTHER PUBLICATIONS

Form PCT/ISA/210 (International Search Report) dated May 1, 2007.

Akiko Takahashi et al., "Shin Communication Tool No Jittai to Doko", DOS/V Magazine, Softbank Publishing Inc., Jan. 1, 2005, vol. 14, No. 1, pp. 238-245.

* cited by examiner (a)

[List of members' personal information database]

| member ID | member name | cell phone number | sex | age zone | star sign | belonging group |
|---|---|---|---|---|---|---|
| M8627 | Tsuneo Tamazawa | 090-8533-**** | male | 25-29 | Aries | Higashi Kasai Bombers |
| F1809 | Yui Umehara | 090-6113-**** | female | 25-29 | Cancer | Shotoku |
| M7321 | Yuki Sho | ......... | male | 20-24 | Pisces | ***** |
| | | | | | | |

(b)

[List of event management database]

| event code | event name | start time | participant ID | | | |
|---|---|---|---|---|---|---|
| IV2245 | WMW live @ P | 2006/02/05/20:00 | 3425 | 2190 | 2312 | ..... |
| IV4578 | bowling game of old class 4 | 2006/02/05/20:00 | 5467 | 7123 | 8921 | ..... |
| IV8907 | DLs regular gathering | 2006/02/05/20:00 | 8923 | 1267 | 8923 | ..... |
| IV8845 | touring express 2006 | 2006/02/05/20:00 | 8987 | 7721 | 9123 | ..... |
| ...... | ............. | | | | | |

[Expression pattern database list]

| expression pattern code | display character string | light pattern file | sound generation file | assignment controlling expression |
|---|---|---|---|---|
| P0001 | Martian group | rp023 | UFO | c(1)="" |
| P0002 | Frog group | gy002 | Wanted | c(2)/y="y" |
| P0003 | Lipstick group | ii078 | todhidhitsnootoko | c(3)/z=z" |
| ...... | ...... | ...... | ...... | ...... |
| P0918 | move your cellular phone closer to... | bb008 | dingaling | n(1)/z |
| P0919 | try with another person | yy004 | butterfly | n(2) |

(b)

[ID group management database list]

| Event code | Assignment code | Expression pattern code | ID list | | | | | | The number of IDs | Attributes | ... |
|---|---|---|---|---|---|---|---|---|---|---|---|
| IV2245 | WT17 | P0004 | 8627 | 1752 | 8734 | 7835 | 5523 | | 5 | 4 | ... |
| IV2245 | WT15 | P0002 | 1809 | 8181 | 8211 | | | | 3 | 2 | ... |
| IV2245 | WT14 | P0001 | 2730 | 9427 | 5043 | 7568 | | | 4 | 0 | ... |
| IV2245 | WT13 | P0934 | 7321 | 5610 | | | | | 2 | 2 | ... |
| IV2245 | WT09 | P0925 | 7182 | 7721 | 6246 | | | | 3 | 1 | ... |
| ...... | | | | | | | | | | | ... |

| | Legends of assignment controlling expressions |
|---|---|
| | Format specifiers |
| :f: | When flag "f" is set, the controlling expression following the sign : is applied. |
| :: | When no other applicable flags exist, the controlling expression following the sign : is executed. |
| ;;~;;...; | Controlling expressions before the control element are processed in parallel when flag is set. When a process to be applied does not exist, processes after ;; are performed. |
| ;f-g-...; | Applied when all of flags are set. |
| :f/g/...: | When any of flags is set, processes after : are applied. |
| >>/>/>>... | Processes after :: are applied. Controlling expression after format specifiers corresponding to the number of > is applied. |
| = | Control element after the sign is coupling control element. Signs such as > and </ are also applied according to coupling control elements. |
| *** | Controlling expression including this control element is not executed. Assignment is performed to numbers smaller than that of this list. A flag + controlling expression related to process of the entire group can be attached after the sign. When there is no code which can be assigned, only existing groups are integrated before assignable code appears. In the impossible case, state management element "aa" is sent back. |
| ***//z | Controlling expression including this control element is not executed. Assignment is performed to numbers smaller than that of this list. In the case where the number of codes which can be assigned is insufficient, the code of the code number "z" is automatically assigned. As identification light-emission and sound-generation codes, light-emission and sound-generation codes for emergency which are prepared by the system are assigned at random. |
| ***//zz | Call target of character string for common comment. |
| ***-dv(n) | As long as :imn instruction does not exist in instruction character string which can be executed by corresponding controlling expression of younger number, dv request of n% or more is permitted. |
| ***-dv | As long as description of dv flag does not exist in instruction character string which can be executed at that time in corresponding controlling expression of younger number, dv request is ignored. |
| ***-st(n) | As long as :imn instruction does not exist in instruction character string which can be executed by corresponding controlling expression of younger number, st request of n% and "h" or more is permitted(it can be omitted. In this case, "h" is a specific value. |
| ***-st | As long as description of st flag does not exist in instruction character string which can be executed at that time in corresponding controlling expression of younger number, st request is ignored. |
| ***-es(n) | As long as :imn instruction does not exist in instruction character string which can be executed by corresponding controlling expression of younger number, es request of n% and "n" or more is permitted (it can be omitted. In this case, "n" is a specific value). |
| ***-es | As long as description of es flag does not exist in instruction character string which can be executed at that time in corresponding controlling expression of younger number, es request is ignored. |

| | Assignment control elements |
|---|---|
| c(n) | Assignment in group formation order. Numerical values designed are in assignment order. When a group of the maximum value is assigned, the code of the minimum numerical value which is not used at present is assigned. |
| n(n) | Assignment according to the number of IDs in group. The numerical value corresponds to the number of IDs. |
| n(n)/z | Assignment according to the number of IDs in group of ID holder having attribute "z". The numerical value corresponds to the number of IDs. |
| n(n)/~r(y) | Assignment of the number of group "z" according to the number of IDs in group at maximum and random. The numerical value corresponds to the number of IDs. |
| l(n)/id | Assignment to group including specific-ID holder. Groups having the controlling expression cannot be coupled. In the case where a numerical value is defined, coupling is possible but priority is placed on a code of larger value. |
| o(n) | Assignment according to the order of the number of IDs in group. The numerical value corresponds to the order. |
| x¹n | The number of IDs in group is assigned to groups of "n" or more. |
| x≠ | The pattern code may not be unique ("n" is unique when the attribute and the control element are automatically assigned). |
| r(n) | Random assignment from codes having the control signal to assignable group. When numerical value is included, r-codes having the same numerical value are assigned. |
| x/z,y,···=z,w,···≠ | Attribute regulation. Assign attribute information in member DB to group of only ID holders corresponding to z, y, and the like. Coupling can be performed only to group including member having attribute following =. In the case where ≠ is assigned, it is sufficient to include the attribute. |
| x/z-y=z-y | Assignment to group having the combination of attributes. Coupling can be performed only to group including member having attribute following =. |
| x¥z=¥z | No assignment to group including the attribute. Coupling cannot be performed to group including the same attribute as that following =. |
| x⟨z,y,···⟩=⟨z,y,···⟩ | Only one ID is permitted to the attribute. When numerical value is assigned to attribute, the number of IDs to the numerical value is permitted. |
| m(z)/:zzz | ID having specific attribute is assigned as one group without connection. Coupling to group having code zzz at that time point. When the group does not exist, same operation for quo/:zzz is performed. |

FIG. 11

| | Coupling control elements |
|---|---|
| x=z' | Code once assigned is taken over to new group as long as the group is not coupled to group of larger number of formation. |
| x=z" | Code having controlling expression is preferentially taken over. The controlling expressions cannot be coupled to each other. |
| x=n | "n" denotes the maximum number of components of group. Coupling exceeding the numerical value is impossible. |
| x<n% | Coupling is possible only in combination of n% of all of participants or less. |
| x>n | When the number of components of group exceeds "n", coupling becomes impossible. |
| x=(n,m) | Coupling is possible to only group having the number of IDs of "n" or "m". |
| x>(n) | Coupling is possible to only group having the number of IDs less than "n". |
| x<(n) | Coupling is possible to only group having the number of IDs equal to or more than "n". |
| x=eq | Coupling is possible to only group having the same number of IDs. |
| x>eq | Coupling is possible to only group having smaller number of IDs. |
| x<eq | Coupling is possible to only group having larger number of IDs. |
| x$~x$$ | In the case where a plurality of assignable pattern codes exist, a code having the controlling expression is preferentially assigned. Highest priority is given to a code having the larger number of signs. When there is no sign, the priority order is expressed as O>I>N>C>R (highest priority is given to code having attribute regulation). |
| x=> | When terminal as component of group is coupled, information of the group on the other side and option of whether coupling is performed or not are displayed. |
| x=<< | When terminal as component of group is coupled, information of the group and option of whether coupling is performed or not are displayed on the terminal on the other side. |
| x=z! | Separate contacted ID from group to which the ID originally belonged. |
| x=z!! | Separate contacted ID from group to which the ID originally belonged and make the ID belong to the group on this side. |
| x=z!!! | Break up the contacted group. |

FIG. 12

| | Control execution elements |
|---|---|
| :bru | Group is broken up to groups each made of one component. Al releases all of groups. |
| :bru(n) | Groups up to group having n-th largest number of IDs are released (when the numbers are the same, group with lower coupling priority and coupled earlier is released). |
| :bru<n> | Groups up to group having n-th smallest number of IDs except for "1" are released (when the numbers are the same, group with lower coupling priority and coupled earlier is released). |
| :bru-n | Reset to coupling state of "n" times ago. Group cannot be re-coupled to the same group. |
| :bru-(n) | Return to state where the group of the maximum ID number becomes "n" or less. |
| :bru/y | Group of "y" defined by grp execution element is released. |
| :bru/y' | Group of "y" defined by grp execution element is released. However, grp name remains as attribute. |
| :bru/y" | Group of "y" defined by grp execution element is released. However, grp name remains and re-coupling is performed only in grp. |
| :dvd/z | Participant having ID and attribute of zzz or making release request in members is separated from group and new code is assigned. Regulation same as Bru/y is given. |
| :jin! | In the case of obtaining ID and address other than those in participant list, ID is given to make participant as event participant. New participant is in singular group. |
| :jin | In the case of obtaining ID and address other than those in participant list, ID is given to make participant as event participant. New participant is included in group. |
| :jin>z, y... | Input screen of attributes of z, y, · appears at the time of participation in event. |
| :quo/n<m | Possible assignment is newly performed with code from "n" to "m". If no possible code, previous code is held, and "a" is sent back. |
| :stp | Wait for flag after :: ;::. Until the flag is set, coupling cannot be performed. |
| :stp-al | All of groups in site cannot be coupled until flag after :: ;::. is set. |
| :grp/z | Give group name of grouping to member and attribute value is stored in group list. Group name is assigned according to predetermined rule. Group name list defined by the user can be also generated. In the case where attribute value is attached, the group also has the attribute. In the case where Grp is used as element of conditional expression and numerical value is attached, it refers to group to which the group code is assigned. In the case of no regulation, it refers to group defined within controlling expression. |
| :end | End of process of the controlling expression. When all of controlling expressions in group tied at the time point is finished or "end" assigned to *** term is executed, process of system is finished and group file is output. |
| :imn | Accept only instruction of organizer. |

FIG. 13

| Command | Description |
|---|---|
| :ato(n) | Automatically couple groups remaining at present to "n" groups so that the numbers of IDs become equal to each other at most. |
| :ato(n%) | Automatically couple groups remaining at present to number equal to or less than n% so that the numbers of IDs become equal to each other at most. |
| :ato/z>(<)n | Automatically couple groups including attribute "z" or the number of IDs equal to or larger (smaller) than "n". |
| :cmp(z)~/y | Determine representative at random from group. Regulation with attribute is also possible. Assign attribute code Z. |
| :cmp(z)-vt | Determine representative by voting in group. Assign attribute code Z. |
| :cmt(zzz)~/xx | Display comment. Comment of Zzz is displayed on terminal. Call and display comment character string in list Xx. |
| :cnt | Display communication request on organizer terminal. |
| :rpl | Display response request on mobile terminal. |
| :cal/z | Start related application. Zzz denotes application name. When there is term which is ID information of attribute of Z, numerical value information is sent to software of activation side. /al denotes participant ID. |
| :pay(z)+=n/y | Numerical value input screen appears in terminal of group. When = n is attached, "n" is displayed, and option of whether the numerical value is approved or not appears. When numerical value is input, attribute of Z is given, and numerical value attached to the attribute of Z is stored. When "-" is attached, numerical value common to group is obtained. Attribute regulation is also possible. |
| slt(z)/n | Select "n" groups from groups generated at the time point, attribute Z is assigned. When nothing is attached, attribute is determined by selection of organizer. Exclude group with individual slt condition. |
| slt(z)=n | Select group having the maximum ID number in total which is n or less and assign attribute Z. |
| slt(z)~slt(z)-a | Assign attribute to the group. /a is never selected. |
| slt(z)-br | Break up unselected group. |
| slt(z)-es | Select from determined groups. |
| slt(z)-gp/zzz | Select from groups with group names. If there is Zzz, designate range of group names. |
| slt(z)-sz | Select groups in order from group having largest ID number. |
| slt(z)-k~k(m) | Select from group made of members having attribute K or group including "m" or more members having attribute K in descending order of k. |
| slt(z)-r | Select at random. |
| slt(z)-t | Select groups in order of assignment time. |
| slt(z)-ac/y | In the case where numerical value information exists in attribute "y", groups are selected in descending order of numerical value averages in the group. When there is no Y term, numerical value input screen appears at the time point. |
| :elm(z) | Erase attribute Z included in group. |
| :lst(z)/xxx | Generate new participant list of participants having attribute Z. At designated time, grouping starts in the list. Xxx denotes code of participant list given. Start time and controlling expression have to be prepared. |
| :bep(z)/zzz | Display display file of zzz for predetermined time in terminal of attribute z in contacted group. |
| bep(z)!/zzz | Display display file of zzz for predetermined time in terminal of attribute z contacted. |

FIG. 14

| | State management elements (flags) |
|---|---|
| un | No group which can be coupled to the group exists. |
| aa | Group which can be coupled does not exist in site. |
| tm(n) | Coupling is not performed for "n" seconds. |
| ta(n) | Coupling is not performed in entire site for "n" seconds. |
| tm(n:nn) | Time n:nn. |
| pc(n)~pc(n)/zpc | n% or more of scheduled number of IDs are coupled to one group. Totaling by attributes is also possible. |
| (n)/zz | n% or more of IDs is coupled in upper zz groups. |
| pc(x) | Send back present coupling rate. |
| od(n) | The number of IDs of group is the n th largest or more. |
| od<n> | The number of IDs of group is the n th smallest or less. |
| od(x) | Send back the order of present group. |
| gr(n) | The number of groups is "n" or larger. |
| gr~n | The number of groups is "n". |
| gr<n/ | The number of groups is "n" or less. |
| gr(x)~gr(x)--cs | Send back the present number of groups. /es sends back the number of groups subjected to grp instruction. |
| df(n) | The ID difference between maximum group and minimum group is "n" or larger. |
| df<n> | The ID difference between maximum group and minimum group is "n" or less. |
| mb(n) | The number of IDs is "n" or larger. |
| mb(n):z | The number of groups whose ID number is "n" or larger becomes Z. |
| mb~n | The number of IDs is "n". |
| mb<n/ | The number of IDs is "n" or less. |
| mb(x)~mb(x)/n,al,z | Send back the number of members of the group or a group of code "n", the number of all of participants, and the number of participants of the attribute. |
| at(n)/z | "n" or more members having attribute z. |
| rn(n) | "n" group codes which can be assigned are assigned. |
| cl/z | Participant having the attribute z enters in adjacent communication range of participant of the group. |
| ct/z | Make contact with participant having attribute z. It can be omitted. |
| mg/n | Request for permission to couple to group with which "n" or more members in the group adjacent communicate is input. |
| mg/n% | Request for permission to couple to group with which n% or more members of the group adjacent communicate is input. |
| dv/n | Group breakup request is input from "n" or more members of the group. |
| dv/n% | Group breakup request is input from n% or higher of members of the group. |
| dv' | Breakup instruction/request while leaving determined group names. |
| dv" | Breakup instruction/request while leaving determined group names. Re coupling is possible only within the group. |
| st/n | Group coupling stop request is input from "n" or more members of the group. |
| st/n% | Group coupling stop request is input from n% or higher of members of the group. |
| cs/n | Group determination request is input from "n" or more members of the group. |

FIG. 15

| | |
|---|---|
| es／n% | Group determination request is input from n% or higher of members of the group. |
| rl／n | Comment replies of "n" or more members are input. |
| rl／n% | Comment replies of n% or more of members are input. |
| ～／z.zzz | Request is input from member having the attribute and ID. |
| wt | Wait for information of related software. When wait cancel instruction from related software comes, it is regarded that flag is set. |
| rg(n)／r～rg(n%) | "n" terminals or n% of terminals enter region of "r" range codes. |
| @(r) ¥@(r) | Coupling is permitted only in the range. ¥ is not permitted. |
| -@(r) ¥@(r) | Assign to state management element indicative of request, and set so that the request is counted or not counted only in the range. |
| mg/r/zzz | When terminal of the group enters the range of "r", the terminal moves to group having code zzz. |
| -dv | Division from the group. |
| -sl/z | Assign attribute z. |
| -el/z | Erase attribute z. |

FIG. 16

| | Organizer's instructions (when no particular description, specific process is executed unconditionally) |
|---|---|
| mg: zzz | Instruction of forced coupling to zzz is issued from organizer terminal. |
| dv | Breakup instruction is issued to group to which group code is assigned from organizer terminal. |
| st | Coupling stop instruction is issued to group to which group code is assigned from organizer terminal. |
| es | Instruction to determine the group is issued from organizer terminal. |
| /al | The instruction is issued from organizer terminal to all of groups. |

*Calculation formula can be inserted to * number of people or percentage. Attributes can be also calculated using as "or", using + as "and", and using ¥ as complement set.

FIG. 17

| | Examples of assignment | |
|---|---|---|
| *In the case of dividing 20 participants in an event to groups each made of five participants. | | |
| Assignment | Assignment controlling expression | |
| 1 | n(1) | |
| 2 | c(1)=5';aa:bru<1>;mb(5):stp | |
| 3 | c(2)=5';aa:bru<1>;mb(5):stp | |
| 4 | c(3)=5';aa:bru<1>;mb(5):stp | |
| 5 | c(4)=5';aa:bru<1>;mb(5):stp | |
| 6 | c(5)=5';aa:bru<1>;mb(5):stp | |
| 7 | c(6)=5';aa:bru<1>;mb(5):stp | |
| 8 | c(7)=5';aa:bru<1>;mb(5):stp | |
| 9 | c(8)=5';aa:bru<1>;mb(5):stp | |
| 10 | c(9)=5';aa:bru<1>;mb(5):stp | |
| 11 | c(10)=5';aa:bru<1>;mb(5):stp | |
| 12 | ***;pc(100)/4:end | |
| | | |
| Another example | | |
| 1 | n$(1)/r(4);:stp;m(2)/8:=(2,4) | |
| 2 | n(1) | |
| 3 | r=2';mb(2)/8:=5;aa:end | |
| 4 | r=2';mb(2)/8:=5;aa:end | |
| 5 | r=2';mb(2)/8:=5;aa:end | |
| 6 | r=2';mb(2)/8:=5;aa:end | |
| 7 | r=2';mb(2)/8:=5;aa:end | |
| 8 | r=2';mb(2)/8:=5;aa:end | |
| 9 | r=2';mb(2)/8:=5;aa:end | |
| 10 | r=2';mb(2)/8:=5;aa:end | |

FIG. 18

```
*In the case of making groups each made of two males and two females from eight male participants and eight female
participants in a party (during the party, it is desired to re-group the participants so that the same participants do
not belong to the same group).  Attribute code of male is M, and that of female is F.

1      n(1)/M F (1)
2      n(1)/F M (1)
3      c(1) 4;aa;end
4      c(2)=4;aa;end
5      c(3)=4;aa;end
6      c(4)=4;aa;end
7      c(5)=4;aa;end
8      c(6)=4;aa;end
9      c(7)=4;aa;end
10     c(8) 4;aa;end Another example
1      n(1)=(1)
2      c(1)=2;aa;;;at(2)/M: F 4;at(2)/F M 4;:=4;aa;end
3      c(2) 2;aa;;;b(2)/M: F 4;b(2)/F M 4;:=4;aa;end
4      c(3)=2;aa;;;b(2)/M:=F=4;b(2)/F M 4;: 4;aa;end
5      c(4)=2;aa;;;b(2)/M:=F=4;b(2)/F M 4;: 4;aa;end
6      c(5)=2;aa;;;b(2)/M: =F: 4;b(2)/F M 4;: 4;aa;end
7      c(6) 2;aa;;;b(2)/M: F 4;b(2)/F=M=4;:=4;aa;end
8      c(7) 2;aa;;;b(2)/M: F 4;b(2)/F=M=4;:=4;aa;end
9      c(8) 2;aa;;;b(2)/M: F 4;b(2)/F=M=4;:=4;aa;end In the case of re-grouping
1      n(1)=(1)
2      c(1) 2;aa;;;at(2)/M:=F=4;at(2)/F=M=4;:=4;aa;slt(T1)
3      c(2) 2;aa;;;b(2)/M:=F=4;b(2)/F=M=4;:=4;aa;slt(T2)
4      c(3) 2;aa;;;b(2)/M:=F=4;b(2)/F=M=4;:=4;aa;slt(T3)
5      c(4)=2;aa;;;b(2)/M: F 4;b(2)/F M 4;: 4;aa;slt(T4)
6      c(5)=2;aa;;;b(2)/M: F 4;b(2)/F M 4;:=4;aa;slt(T5)
7      c(6) 2;aa;;;b(2)/M: F 4;b(2)/F=M=4;:=4;aa;slt(T6)
8      c(7)=2;aa;;;b(2)/M: F=4;b(2)/F M 4;: 4;aa;slt(T7)
9      c(8)=2;aa;;;b(2)/M: F 4;b(2)/F M 4;: 4;aa;slt(T8)
10     ***;dv;bru;quo/11
11     n(1)/M+T1 F+¥T1=(1)
12     n(1)/M T2 F ¥T2=(1)
13     n(1)/M T3 F ¥T3=(1)
14     n(1)/M+T4=F+¥T4=(1)
15     n(1)/M+T5=F+¥T5=(1)
16     n(1)/M T6 F ¥T6 (1)
17     n(1)/M T7=F ¥T7=(1)
18     n(1)/M+T8=F+¥T8=(1)
19     n(1)/F+T1=M ¥T1 (1)
20     n(1)/F+T2 M+¥T2=(1)
21     n(1)/F T3 M+¥T3=(1)
22     n(1)/F T4 M+¥T4=(1)
23     n(1)/F+T5 M ¥T5 (1)
24     n(1)/F+T6 M ¥T6 (1)
25     n(1)/F+T7 M ¥T7 (1)
26     n(1)/F T8 M ¥T8=(1)
27     r/T1# YT1 4;aa;end
28     r/T2# YT2 4;aa;end
29     r/T3# YT3=4;aa;end
30     r/T4# YT4=4;aa;end
31     r/T5# YT5 4;aa;end
32     r/T6#=¥T6=4;aa;end
33     r/T7#=¥T7=4;aa;end
34     r/T8#=¥T8=4;aa;end
35     ***/27>34
```

FIG. 19

*In the case of dividing 830 participants in a live event into two groups of almost the same number of participants at the site. The participants are divided into groups of (maximum difference of 24 participants)*maximum difference (even number) or less. After that, the groups are absorbed to two groups using (the number of participants + maximum difference)/2 as the maximum value. In the case of odd numbers, the difference of the initial number of groups + 1.

| | |
|---|---|
| 1 | n(1)=24 |
| 2 | n(2)=24 |
| 3 | n(3)=24 |
| 4 | r=24;aa/tm(120):quo/213 |
| *208 | ... |
| 211 | r=24;aa/tm(120):quo/213 |
| 212 | *** |
| 213 | o(1)=427";aa:end |
| 214 | o(2)=127";aa:end |

Another example

| | |
|---|---|
| 1 | n(1) |
| 2 | n(2) |
| 3 | n(3) |
| 4 | r'{4>13;aa:quo/212 |
| *208 | |
| 211 | |
| 212 | r>276;aa:bru(1)-(415);f<24>:end |
| *64 | ... |
| 275 | r>276;aa:bru(1)-(415);f<24>:end |

FIG. 20

In a live event using a baseball field where 48,234 prospective participants are gathering, the audience is sorted to seats on the right and left sides (each side accommodating 25,000 people). After entrance, a group of people who can enter the mosh pit (standing space) accommodating 5,000 people provided in the center field is selected by lot. Guards having attributes RS, LS, and PS are in right and left bench-sheet entrances and the pit entrance. The audience to 200 premium seats on sides of a stage is chosen by auction.

| | |
|---|---|
| 1 | n(1)=1766;cl/RS:slt(RS):m/5;cl/LS:slt(LC):m/6 |
| 2 | n(2)=1766;cl/RS:slt(RS):m/5;cl/LS:slt(LC):m/6 |
| 3 | n(3)=1766;cl/RS:slt(RS):m/5;cl/LS:slt(LC):m/6 |
| 4 | r=1766;cl/RS:slt(RS):m/5;cl/LS:slt(LC):m/6 |
| 5 | m(RS)=RS;cl(RC):bep!(RC)/8 |
| 6 | m(LS)=LS;cl(LC):bep!(LC)/8 |
| 7 | m(PS)=PS;cl(PC):bep!(PC)/11 |
| 8 | ***/4;es/50%:stp |
| 9 | c(1)=25000;aa/es:bru:quo12 |
| 10 | c(2)=25000;aa/es:bru:quo12 |
| 11 | *** |
| 12 | group determination request from group of people who wish to enter the pit |
| 13 | group determination request from group of people who wish to enter the pit |
| 14 | n(1) |
| 15 | group determination request from group of people who wish to enter the pit |
| 16 | group determination request from group of people who wish to enter the pit |
| 17 | ***/15,16;es:bru−al(YPC):quo/18 |
| 18 | n(1)/RS=RS;es/1:cmt/22:pay(AU);es/1:stp;;es:slt(PR)−ac/AU=100:cal/PR/perica |
| 19 | n(1)/LS=LS;es/1:cmt/22:pay(AU);es/1:stp;;es:slt(PR)−ac/AU=100:cal/PR/perica |
| 20 | c(1)/RS=RS;es/50%:cmt/22:cmp(W):pay(AU)−/W;es/W:stp;;es:slt(PR) ac/AU 100:cal/PR/perica |
| 21 | c(2)/LS LS;es/50%:cmt/22:cmp(W):pay(AU)−/W;es/W:stp;;es:slt(PR) ac/AU 100:cal/PR/perica |
| 22 | Auction for premium seats will start. Determine amount (per person) and enter it by representative. |

Zone control
Permit 100 terminal-holders having attribute C to enter per time.

| | |
|---|---|
| 20 | ***:quo/21 |
| 21 | m(S)=S! |
| 22 | n(1)/C=C!! |
| 23 | n(1):stp |
| 24 | r=C!!=100;m(100)/es:cmt/25:bep/25;;es:bru:quo26 |
| 25 | ***Show your cellular phone to staff and enter! |
| 26 | |

FIG. 21

```
* Check if 80% or more participants exist in a party of 46 prospective participants.  Generate list of
participants to be charged for participation fee.
1       n(1);pc(80):cmt (contact us!)
2       n(2)
3       c(1)=';pc(80):slt(v)
*16     ...
18      c(16)=';pc(80):slt(v)
19      ***;rl(46-mb(x)/v)/tm(19:45):quo/20
20      ato(1)>2:grp:end
```

In the case where jump-in participants are also allowed.  Attribute R is assigned in advance to participants.
```
1       n(1):jin;pc(80)/R:cmt (contact us!)
2       n(2):jin
3       c(1)=':jin;pc(80)/R:slt(v)
*16     ...
18      c(16)=':jin;pc(80)/R:slt(v)
19      ***;rl(mb(x)-mb(x)/v)/tm(19:45):quo/20
20      ato(1)>2:grp:end
```

* In the case where a group of five people call their acquaintances for a bar after a club event.  The bar accommodates about 15 people at the maximum.
```
1       m=15:jin>M,F;aa:end
``` the number of people and male-female ratio are known anywhere in the site.  Comments can be sent by attributes if there is a message.

* Darts interfaced with mobile network are going to be played among eight tables in a bar.  The attribute of employees is E.  Initially, a participant list of only employees of 4ID is generated.  A participant list to be entered in a game system "netdurts" is generated.  (Game data entry score management application is automatically downloaded to cellular phone).  Score is displayed on the screen.

```
1       n(1)
2       c(1)/E=E:jin!;aa:bru
3       c(2)¥E=¥E":jin;es/1:grp:stp
*8
9       c(9)¥E=¥E":jin;es/1:grp:stp
10      ***+dv(1);aa:cal/netdurts:end
```

FIG. 22

* Generation of a participant team and a participant list from applicants gathered at the site of a free-for-all beach volleyball game meeting (four-on-four system). The maximum number of teams is 16 at the maximum. The number of staffs in the meeting is two. An initial list is made of the two staffs and four teams already applied. The attribute of the staffs is S. The four teams applied have attributes R1, R2, R3, and R4.

Select at random (applied teams are selected automatically).
1     n(1):slt-a
2     c(1)/E=E:jin!:slt-a
3     c(2)/R1=R1=4:jin!;mb(4)+es(1):grp:slt(m)
4     c(2)/R2=R2=4:jin!;mb(4)+es(1):grp:slt(m)
5     c(2)/R3=R3=4:jin!;mb(4)+es(1):grp:slt(m)
6     c(2)/R4=R4=4:jin!;mb(4)+es(1):grp:slt(m)
7     r=4=YS',R1,R2,R3,R4:jin;mb(4)+es(1):grp:jin!
*20
26     r=4=YS',R1,R2,R3,R4:jin;mb(4)+es(1):grp:jin!
27     \*\*\*/7;tm(11:00):slt(m)/12-es-r:end Teams are determined in a draw.
1     n(1):slt-a
2     c(1)/E=E:jin!:slt-a
3     c(2)/R1=R1=4:jin!;mb(4)+es(1):grp:cmt/28:cmp(v)
4     c(2)/R2=R2=4:jin!;mb(4)+es(1):grp:cmt//28:cmp(v)
5     c(2)/R3=R3=4:jin!;mb(4)+es(1):grp:cmt//28:cmp(v)
6     c(2)/R4=R4=4:jin!;mb(4)+es(1):grp:cmt//28:cmp(v)
7     r=4=YS',R1,R2,R3,R4:jin;mb(4)+es(1):grp:jin!:cmt//28:cmp(v)
*20
26     r=4'=YS,R1,R2,R3,R4:jin;mb(4)+es(1):grp:jin!:cmt//28:cmp(v)
27     \*\*\*/7;tm(11:00):stp-al:bru'-al:quo/29
28     Representative (cellular phone with display of "draw participant") is asked to come to No. 4 court.
29     n(1)/v
30     n(1):stp
31     r/v=v';aa/tm(11:30):stp:cmt(Draw will be started.)
32     \*\*\*/31:slt(m)/16-gp:end

FIG. 23

*Generation of an audience list for collecting contributions in a charity concert to be held in open space of the building H in Akasaka, a contributor list, and a mail address list for notification of the next occasion. Obviously without sound and with suppressed light emission. The number of staff is one. The attribute of staff is S. To ID with which money transferring process was performed in another application, the attribute G is attached. Associated with application "perica" for contribution application.

| | |
|---|---|
| 1 | n(1):jin |
| 3 | r:jin |
| 4 | ***/4;es:dvd/S:cmt/21:grp:bru-al:cal/perica;wt:quo/6 |
| 5 | ***//Can software for contribution collection for saving suffering mine victims in Mozambique be started? |
| 6 | m(G):grp:cmt/23:end |
| 7 | ***// Thank you. Please stay after concert so that the organizer can thank you. |

* Either-or quiz is played for prizes in a live event until five participants remain as winners. The number of staffs carrying either-or cards is two. The attribute of staff is S. The IDs of the two staffs are 8976 and 7234. A list is generated in the beginning of the event.

| | |
|---|---|
| 1 | n(1)YL=S |
| 2 | n(1)/L=Y(S,L) |
| 3 | 1/8976="; aa:cnt;dv:quo/6;es:quo/7 |
| 4 | 1/7234="; aa:cnt;dv:quo/6;es:quo/7 |
| 5 | *** |
| 6 | c(1);mb<4>/mb(x)/7-at(x)/W:bru:quo/1;mb=5/mb(x)/7-at(x)/W:end;mb(6)/mb(x)/7+at(x)/W:slt(L):quo/2 |
| 7 | c(2)=¥L;mb<4>/mb(x)-at(x)/W:cmt/9:quo/8;mb=5/mb(x)+at(x)/W:cmt/10:quo/8;mb(6)/mb(x)+at(x)/W:quo/1 |
| 8 | r=W";slt(W);mb(5);grp:cmt/10:end |
| 9 | ***/8// Please wait for a while. |
| 10 | ***// Prize winners are determined! Please come to the front. |

FIG. 24

*Call a crowd of about 3,000 people naturally gathered in open space to organize a representative committee so that they behave orderly and are not controlled by an agitator. (When a base station near a shelter remains at the time of disaster, an aid receiving committee is organized). The attribute of policemen (aid staffs) is P.

| | |
|---|---|
| 1 | n(1):jin!:cmt(Make a group among neighbors and chose a representative.) |
| 2 | m(P)=P:jin! |
| 3 | r>7:jin!;a:cmp(C1)-vt:grp:=grp |
| 4 | ***/3;at(250)/C1/es:dvd(C1)':quo/4 |
| 5 | n(1)/C1=C1:jin!:cmt(Select sub-representative from representatives.) |
| 6 | n(1)=¥C1:jin! |
| 7 | r>7:jin!;a:cmp(C1)-vt:grp:dvd(C1)'=grp |
| 8 | r/C1=C1>4:jin!;a:cmp(C2)-vt:grp:=grp |
| 9 | ***/7,8;at(35)/C2/es:dvd(C2)':quo/10 |
| 10 | n(1)/C2=C2:jin!:cmt(Select representative committee from sub-representatives.) |
| 11 | n(1)=¥C1,¥C2:jin! |
| 12 | r>7:jin!;a:cmp(C1)-vt:grp:dvd(C1)'=grp |
| 13 | r/C1=C1>4:jin!;a:cmp(C2)-vt:grp:dvd(C2)'=grp |
| 14 | r/C2=C2>3:jin!;a:cmp(C3)-vt:grp:=grp |
| 15 | ***/12,13,14;at(5)/C3/es:cmt(Representative committee organizes requests ) |

GROUPING SYSTEM, GROUPING MANAGEMENT SERVER, AND GROUPING PROGRAM

TECHNICAL FIELD

The present invention relates to a grouping system, a grouping management server, and a grouping program for grouping participants of an event on the basis of combinations of ID information of the event participants.

BACKGROUND ART

At the time of holding events such as various games, entertainments, and recreations, to produce fun of encounter and participation in a group, in many cases, a group participating method of dividing event participants into groups of predetermined number of people is often employed. The grouping of participants is generally performed in advance by an organizer at random or according to attributes of the participants and the like (refer to, for example, patent document 1).

Whether participants grouped and gathered are in the same place at the same time or not is confirmed by using GPS locator-equipped mobile terminals carried by the participants (refer to, for example, patent document 2).

Patent document 1: Japanese Patent Application Laid-Open (JP-A) No. 2004-171239

Patent document 2: JP-A No. 2000-331284

PROBLEMS TO BE SOLVED

However, the main purpose of the grouping according to the invention disclosed in the patent document 1 is to make pairs of men and women. Evaluation points for a plurality of persons of the opposite sex are entered in advance. A server on the organizer side totals evaluation points and allows participation of persons having high evaluation points for each other. Consequently, participation is not determined by direct intensions of the participants at a site where an event is held, so that the grouping securing both fairness and fun of encounters is not realized.

The invention described in the patent document 2 is provided to recognize the position of a group participant by a GPS device and relates to technical means capable of recognizing the positions of participants by registering the group participants in advance. Therefore, the invention cannot be applied to the case of forming a group at the site and recognizing the positions of participants of the formed group. That is, even when positions of participants specified by the GPS device are close to each other, it does not mean that the participants form a group. The recognition of whether participants are in the same place at the same time or not by using GPS device also has a problem that it cannot be applied to a terminal on which no GPS device is mounted.

An object of the present disclosure is to provide technical means for expansively forming a group of participants participating in an event or the like on the basis of intensions of the participants, and recognizing a group forming process.

MEANS FOR SOLVING THE PROBLEMS

To achieve the object, the present disclosure provides a grouping system for grouping a plurality of participants participating in an event, including: a mobile terminal carried by each of the participants having adjacent terminal communicating means capable of transmitting/receiving information to/from an adjacent mobile terminal; and a grouping management server for grouping the participants by transmitting/receiving information to/from the mobile terminals. The grouping management server includes: a members' personal information database for recording member ID information of the participants; an ID information combination database for receiving and recording a combination of ID information obtained by one mobile terminal from another one or more mobile terminals by the adjacent terminal communicating means and ID information of the one mobile terminal; an event management database for recording content of at least one event; an ID group management database for registering an ID group formed on the basis of the combination of the ID information; management server transmitting/receiving means for transmitting/receiving information to/from the mobile terminal; group managing means for forming the ID group by linking ID information combinations having common ID information, recorded in the ID information combination database; and control means for controlling the databases and the means. The group managing means forms the ID group as an event participation group on the basis of a preset group forming condition.

In the above system, linkage of ID information combinations recorded in the ID information combination database and having common ID information denotes, for example, coupling of ID information combinations having common ID information or formation of a group of ID information combinations having common ID information by performing control under the group forming condition.

Formation of the ID groups by the group managing means denotes, for example, grouping of a plurality of participants by forming one group from a plurality of participants, dividing a plurality of participants into a plurality of groups, and assignment of attributes to belonging IDs.

Further, in the above system, in the case of obtaining an ID from one or more mobile terminals by the adjacent communicating means, IDs may be obtained from one or more mobile terminals at the same time by communicating means such as a mobile terminal having an ad-hoc group forming function using an IC chip, radio, or the like. For example, IDs may be obtained simultaneously from two or more mobile terminals. In this case, a process can be performed on assumption that a plurality of ID information pieces are simultaneously exchanged, and a combination of ID information obtained by one mobile terminal from at least one or more another mobile terminals by the adjacent terminal communicating means and the ID information of the one mobile terminal can be processed as a combination of three or more ID information pieces by the grouping management server. In such a case, as a process operation performed by a process operating unit of one mobile terminal, the ID information can be paired (a pair of ID information obtained from another mobile terminal and ID information of the one mobile terminal) and processed sequentially in some order.

A participant who is going to participate in an event registers himself/herself as a member and obtains ID information of himself/herself (member ID) preliminarily by, for example, accessing a server installed so as to be able to be connected to a network such as the Internet by a provider of the system (such as an event organizer) via a mobile terminal of the participant. The ID information (member ID) is recorded in the members' personal information database of the grouping management server on the event organizer side and also recorded in the mobile terminal carried by the participant.

The mobile terminal has adjacent terminal communicating means (that is, a local interface) which can transmit/receive information to/from an adjacent mobile terminal. The adjacent terminal communicating means transmits/receives mainly ID information and is, for example, a combination of an IC chip with an antenna and a reader. The adjacent terminal communicating means is provided for a mobile terminal carried by an event participant, and ID information of another mobile terminal recorded in the IC chip is read by the reader of the one mobile terminal. The adjacent terminal communicating means may be a Bluetooth (registered trademark) or infrared communication device, or a two-dimensional barcode and a reader, and the like. It is also possible to obtain the ID of locally existing another group by using an ad-hoc group communication function using radio communication or the like.

For a mobile terminal having no adjacent terminal communicating means or to enhance the function, a relay for exchanging ID information linked to a mobile terminal by radio or by wire may be provided. The relay has various adjacent communicating means and has the function of exchanging ID information of a linked terminal with other terminals and relays in the communication range of the relay itself.

One mobile terminal transmits a combination of ID information of itself and ID information read from another mobile terminal to the grouping management server. In this case, as described above, when IDs are obtained simultaneously from two or more mobile terminals, a process can be performed on assumption that a plurality of ID information pieces are simultaneously exchanged, and a combination of ID information obtained by one mobile terminal from at least one or more another mobile terminals by the adjacent terminal communicating means and the ID information of the one mobile terminal may be transmitted as a combination of three or more ID information pieces to the grouping management server. In such a case, as a process operation performed by a process operating unit of one mobile terminal, the ID information can be paired (a pair of ID information obtained from another mobile terminal and ID information of the one mobile terminal) and transmitted sequentially in some order to the grouping management server.

The grouping management server receives and records combinations of ID information transmitted from the mobile terminals of the participants. By linking a plurality of ID information combinations having common ID information under the group forming condition, an ID group is formed. The ID group is a group for participation in an event.

The group forming condition is, for example, a regulation based on the attributes given to the IDs in accordance with the number of participants per group, the sex of each of the participants, or situations in control execution. The forming conditions are inserted in a grouping program and specified by a program controlling expression or the like.

The grouping management server further includes an expression pattern database for recording expression pattern information displayed at least on a screen of the mobile terminal. Each time a new ID group is formed by linking ID information combinations or ID groups having the common ID information, the group managing means transmits predetermined expression pattern information extracted from the expression pattern database to the mobile terminals of the participants belonging to the new ID group.

When a new group is formed, information of expression patterns displayed on the screens of the mobile terminals of the participants belonging to the group is transmitted from the group managing means to the mobile terminals. The expression pattern includes not only information of characters and images displayed on the screens of the mobile terminals but also sound and information for light emission. By the characters on the screen, both of the number of participants in the formed group and the number of all of participants are also displayed. To a participant grouped in such a manner, each time a group to which the participant belongs is formed, identification expression and group information is transmitted in a real-time manner. It is also possible to display not only the number of participants in the group but also ID information of the group participants.

Different ID information (member IDs) of group participants may be set for each of events to participate. It is also possible to assign IDs preliminarily to all of terminals having dedicated devices or to which an application is downloaded and use the IDs as member IDs of participants of the events. ID information (member ID) assigned to a participant may be in various patterns which are properly employed.

If the GPS function is provided for at least one of mobile terminals carried by participants belonging to an ID group, by executing the GPS function, the places of all of participants belonging to the ID group can be recognized. Therefore, all of participants do not have to carry mobile terminals each having the GPS function. In the case where predetermined number of terminals or more have the GPS function, the convenience can be further increased by generating an event in a specific place, regulation of group formation, or the like.

The grouping system may further include, as an event participant carrying item, a display screen device for receiving and displaying the expression pattern information. The display screen device can display the same expression pattern as that displayed on the mobile terminal each time a new ID group is formed.

As the display screen device for receiving and displaying an expression pattern, for example, a display screen device, for example, in a name plate shape is provided with a liquid crystal screen face, a light emission lamp, a speaker, and the like and attached to the body of a participant. In such a manner, the expression effect of the expression pattern can be enhanced. The expression pattern may be displayed by providing an earring, a watch, glasses, sun glasses, or the like with at least one of a screen, a light emission lamp, and a speaker.

In the system, the grouping management server may be further provided with an organizer terminal for inputting a participant grouping instruction for each event to the grouping management server. By an input from input means of the organizer terminal, an organizer-side grouping instruction can be transmitted to the grouping management server event by event. Further, each of databases of the grouping management server can be registered or changed.

In the grouping management server which receives an instruction from the organizer terminal, the controlling expression generating means extracts a predetermined control element or the like from a control element database and generates a controlling expression according to an instruction. By executing the controlling expression, the group managing means or the like generates an ID group.

In any of grouping systems, the one mobile terminal for obtaining ID information from the another one or more mobile terminals by adjacent terminal communicating means has the functions of performing: a process operation of obtaining information of data destinations of mobile terminals from the another one or more mobile terminals (for example, telephone number, mail address, and the like of the another one or more mobile terminals) via the adjacent terminal communicating means, and determining, on the basis of the information obtained from the another one or more mobile terminals, whether or not the mobile terminal is a mobile terminal storing a system application in a storage (such as a memory device) of the mobile terminal (for example, a mobile terminal in which the system application is downloaded or a commercially-available mobile terminal in which the system application is stored in a memory device); and a process operation, when the mobile terminal is determined as a mobile terminal which does not store the application in its storage, of transmitting the information of the data destination of the mobile terminal obtained to the grouping management server. The grouping management server has the function of performing a process operation of, when the information of the data communication destination of the mobile terminal is obtained from the one mobile terminal, downloading the application to the mobile terminal and assigning a member ID on the basis of the information of the data communication destination.

In any of the grouping, the one mobile terminal for obtaining ID information from the another one or more mobile terminals by the adjacent terminal communicating means has the function of performing: a process operation of obtaining any of a mobile terminal device ID of the another one or more mobile terminals, an ID of the adjacent communicating means device (such as a chip ID), a user ID, and a contractor ID from the another one or more mobile terminals via the adjacent terminal communicating means, and determining, on the basis of the information obtained from the another one or more mobile terminals, whether or not the mobile terminal is a mobile terminal storing a system application in a storage (such as a memory device) of the mobile terminal (for example, a mobile terminal in which a system application is downloaded or a commercially available mobile terminal in a state where the system application is stored in a memory device); and a process operation, when the mobile terminal is determined as a mobile terminal having no application in its storage, of transmitting any of the mobile terminal device ID of the mobile terminal, the ID of the adjacent communicating means device, the user ID, and the contractor ID obtained to the grouping management server. The grouping management server has the function of performing a process operation of, when any of the mobile terminal device ID of the another one or more mobile terminals, the ID of the adjacent communicating means device, the user ID, and the contractor ID is obtained from the one mobile terminal, accessing an ID management server for managing the mobile terminal device ID, the ID of the adjacent communicating means device, the user ID, or the contractor ID in an ID management database on the basis of any of the mobile terminal device ID, the ID of the adjacent communicating means device, the user ID and the contractor ID obtained. The ID management server is, for example, a server device for managing the mobile terminal device ID, the ID of the adjacent communication means device, the user ID and the contractor ID by an ID management database such as a server device for managing the mobile terminal like a server device of a portable carrier, a server device of an IC chip addition value service company, a public Ucode management server device, and a management server device of an adjacent communicating device provided for the mobile terminal. The grouping management server obtains information of a data communication destination of the mobile terminal (for example, the telephone number and the mail address of the another one or more mobile terminals) specified by any of the mobile terminal device ID, the ID of the adjacent communicating means device, the user ID, and the contract ID obtained. On the basis of the information related to the data communication destination, the grouping management server downloads the application to the mobile terminal, and assigns a member ID.

Also in any of the grouping systems described above, the one mobile terminal for obtaining ID information from the another one or more mobile terminals by the adjacent terminal communicating means has the function of performing: a process operation of determining whether the mobile terminal is a mobile terminal having a system application in a storage (such as a memory device) of the mobile terminal or not (for example, a mobile terminal to which a system application is downloaded, or a commercially-available mobile terminal in which the system application is stored in a memory device) on the basis of information obtained from the mobile terminal when communication is performed with the another one or more mobile terminals via the adjacent terminal communicating means. The one mobile terminal also performs a process operation of determining whether the mobile terminal is a mobile terminal to which a member ID is assigned or not, and a process operation of transmitting information for starting the application to the mobile terminal via the adjacent terminal communicating means when the mobile terminal is determined as a mobile terminal which stores the application in its storage but to which no member ID is assigned.

Further, in any of the grouping systems described above, each time an ID group is formed by linking ID information combinations recorded in an ID information combination database and having common ID information, the group managing means registers information of the formed ID group into the ID group management database so as to be associated with formation time of the ID group, updates information on a process of forming the same ID group, and registers update history information into the ID group management database.

In any of the grouping systems, the group managing means can have the function of performing a process operation of outputting predetermined information registered in the ID group management database every predetermined time or predetermined information registered in the ID group management database corresponding to a request from a terminal accessing the grouping management server, in accordance with the request.

To achieve the object, the present disclosure proposes a grouping management server for grouping a plurality of participants participating in an event by transmitting/receiving information to/from a mobile terminal carried by each of the participants, having adjacent terminal communicating means capable of transmitting/receiving information to/from an adjacent mobile terminal at the time of grouping the participants. The grouping management server includes: a members' personal information database for recording member ID information of the participants; an ID information combination database for receiving and recording a combination of ID information obtained by one mobile terminal from another one or more mobile terminals by the adjacent terminal communicating means and ID information of the one mobile terminal; an event management database for recording content of at least one event which is held; an ID group management database for registering an ID group formed on the basis of the combination of the ID information; management server transmitting/receiving means for transmitting/receiving information to/from the mobile terminal; group managing means for forming the ID group by linking ID information combinations having common ID information, recorded in the ID information combination database; and control means for controlling the databases and the means. The group managing means forms the ID group as an event participation group on the basis of a preset group forming condition.

In this case as well, linkage of ID information combinations recorded in the ID information combination database and having common ID information denotes, for example, coupling of ID information combinations having common ID information or formation of a group of ID information combinations having common ID information by performing control under the group forming condition.

Formation of the ID group by the group managing means denotes, for example, grouping of a plurality of participants by forming one group from a plurality of participants, dividing a plurality of participants into a plurality of groups, and assignment of attributes to belonging IDs.

The aforementioned grouping management server further includes an expression pattern database for recording expression pattern information displayed at least on a screen of the mobile terminal. Each time a new ID group is formed by linking ID information combinations or ID groups having the common ID information, the group managing means transmits predetermined expression pattern information extracted from the expression pattern database to the mobile terminals of the participants belonging to the new ID group.

In any of the grouping management servers, wherein each time an ID group is formed by linking ID information combinations recorded in an ID information combination database and having common ID information, the group managing means registers information of the formed ID group into the ID group management database so as to be associated with formation time of the ID group, updates information on a process of forming the same ID group, and registers update history information into the ID group management database.

In any of the grouping management server, the group managing means can have the function of performing a process operation of outputting predetermined information registered in the ID group management database every predetermined time or predetermined information registered in the ID group management database corresponding to a request from a terminal accessing the grouping management server, in accordance with the request.

Further, to achieve the object, the present disclosure provides a grouping program for making a management server execute a grouping process for grouping a plurality of participants participating in an event by transmitting/receiving information to/from a mobile terminal carried by each of the participants, having adjacent terminal communicating means capable of transmitting/receiving information to/from an adjacent mobile terminal. The grouping program makes a computer (for example, the management server) execute: a process of receiving a combination of ID information obtained by one mobile terminal from another one or more mobile terminal by the adjacent terminal communicating means and ID information of the one mobile terminal from the one mobile terminal; and a process of forming, as an event participation group, the ID group by linking received ID information combinations having common ID information on the basis of a preset group forming condition.

The process of forming the ID group as an event participation group on the basis of the preset group forming condition by linking combinations of ID information, having common ID information is, for example, formation of a group having common ID information by coupling the ID information combinations having the common ID information or performing control under the group forming conditions, formation of one group made of a plurality of participants, division of a plurality of participants into a plurality of groups, and grouping of a plurality of participants by giving attributes to belonging IDs.

By executing the computer program by a computer, the grouping management server performing the process operations is realized.

EFFECT OF THE DISCLOSURE

According to the present disclosure, a group of event participants can be formed in a real-time manner on the basis of the intension of participants. An organizer side can always grasp that participants of a formed group are simultaneously in the same place (exist in the same area or region at the same time).

Further, according to the present disclosure, information of participants voluntarily grouped for various purposes and allowed to participate at a site can be provided as digital information at low cost to devices and programs for managing the other kinds of events and games.

BRIEF DESCRIPTION OF THE DRAWINGS

FIG. 3 (*b*) is a schematic configuration diagram of the display screen device.

FIG. 7 (*a*) is a list of member personal information databases.

FIG. 7 (*b*) is a list of event management databases.

FIG. 8 (*a*) is a list of expression pattern database.

FIG. 8 (*b*) is a list of ID group management database.

FIG. 9 is a list of legends of assignment controlling expressions.

FIG. 10 is an example of a list of assignment control elements.

FIG. 11 is an example of a list of coupling control elements.

FIG. 12 is an example of a list of control execution elements.

FIG. 13 is an example of a list of control execution elements.

FIGS. 14 and 15 show a list of state management elements (flags).

FIG. 16 is a list of organizer's instructions.

FIG. 17 is an example of assignment controlling expressions.

FIG. 18 is an example of assignment controlling expressions.

FIG. 19 is an example of assignment controlling expressions.

FIG. 20 is an example of assignment controlling expressions.

FIG. 21 is an example of assignment controlling expressions.

FIG. 22 is an example of assignment controlling expressions.

FIG. 23 is an example of assignment controlling expressions.

FIG. 24 is an example of assignment controlling expressions.

DETAILED DESCRIPTION OF THE PREFERRED EMBODIMENTS

Preferred embodiments will be described below with reference to attached drawings.

Figure 1:
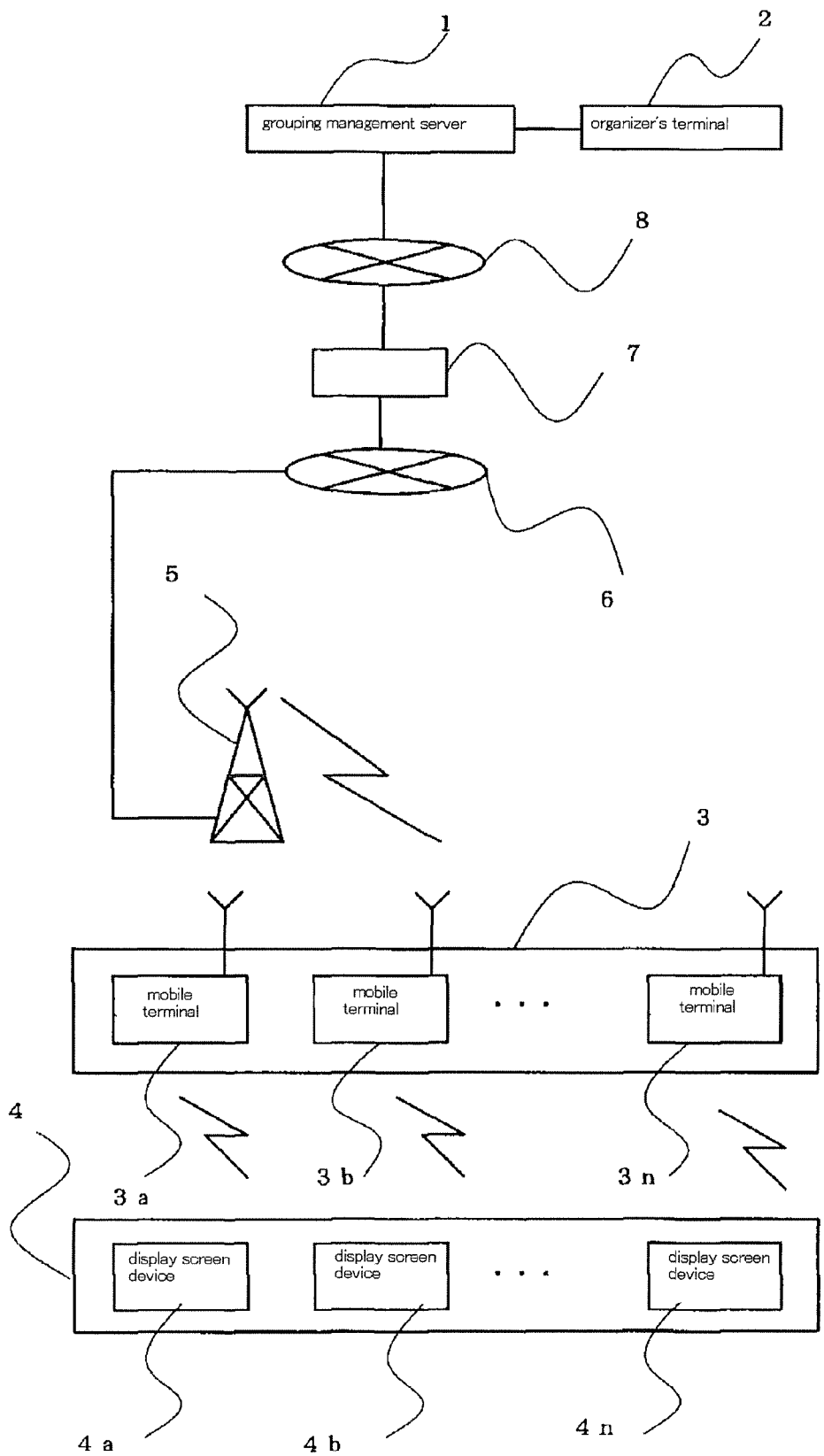
FIG. 1 is a general configuration diagram of a grouping system according to an embodiment of the present invention.
Figure 2:
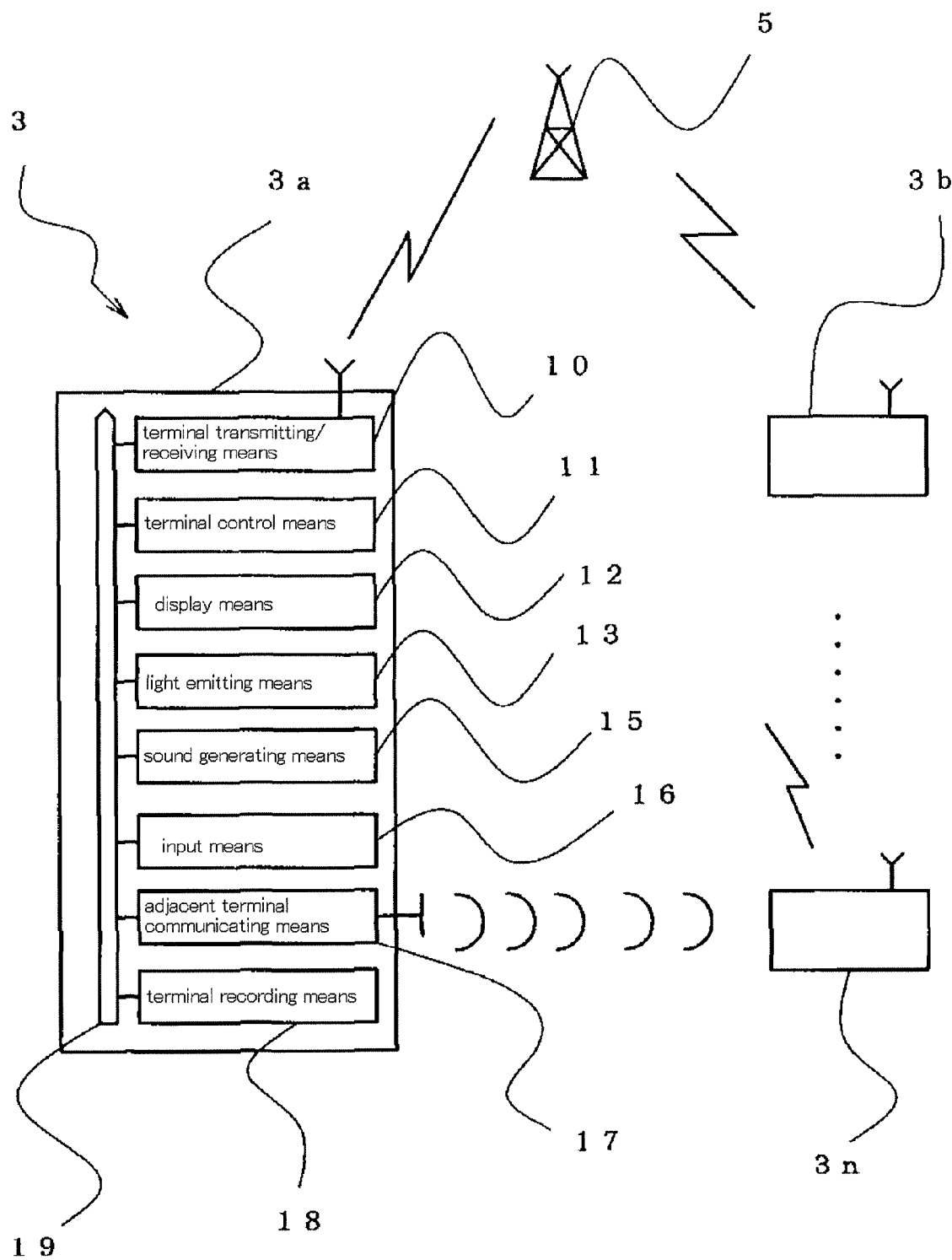
FIG. 2 is a schematic configuration diagram of a mobile terminal.
Figure 3:
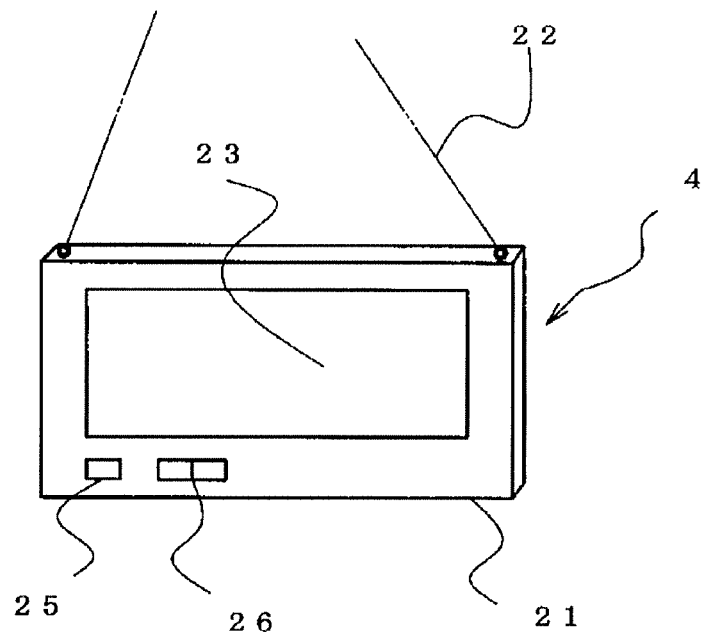
FIG. 3 (*a*) is a perspective view of a display screen device.
Figure 3:
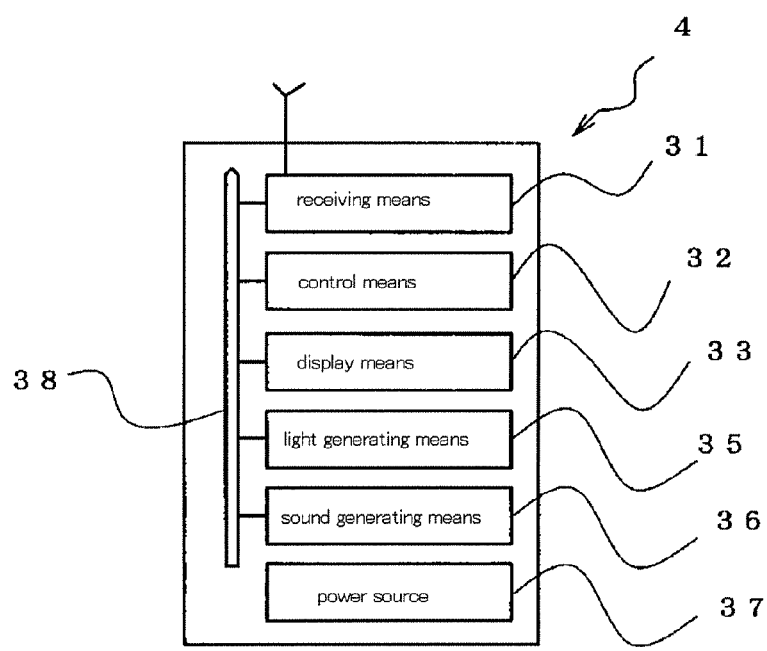
Figure 4:
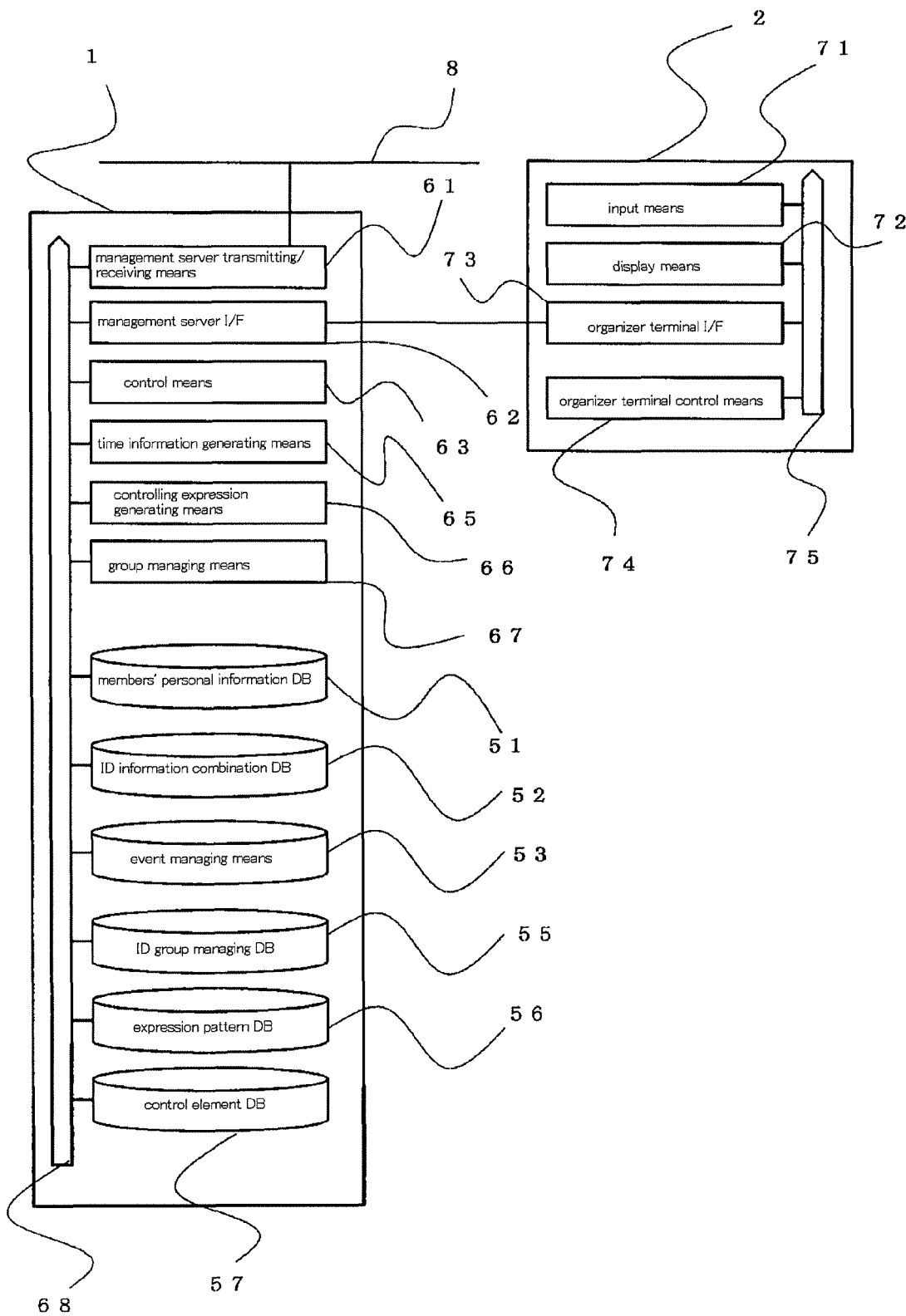
FIG. 4 is a schematic configuration diagram of a grouping management server.
Figure 5:
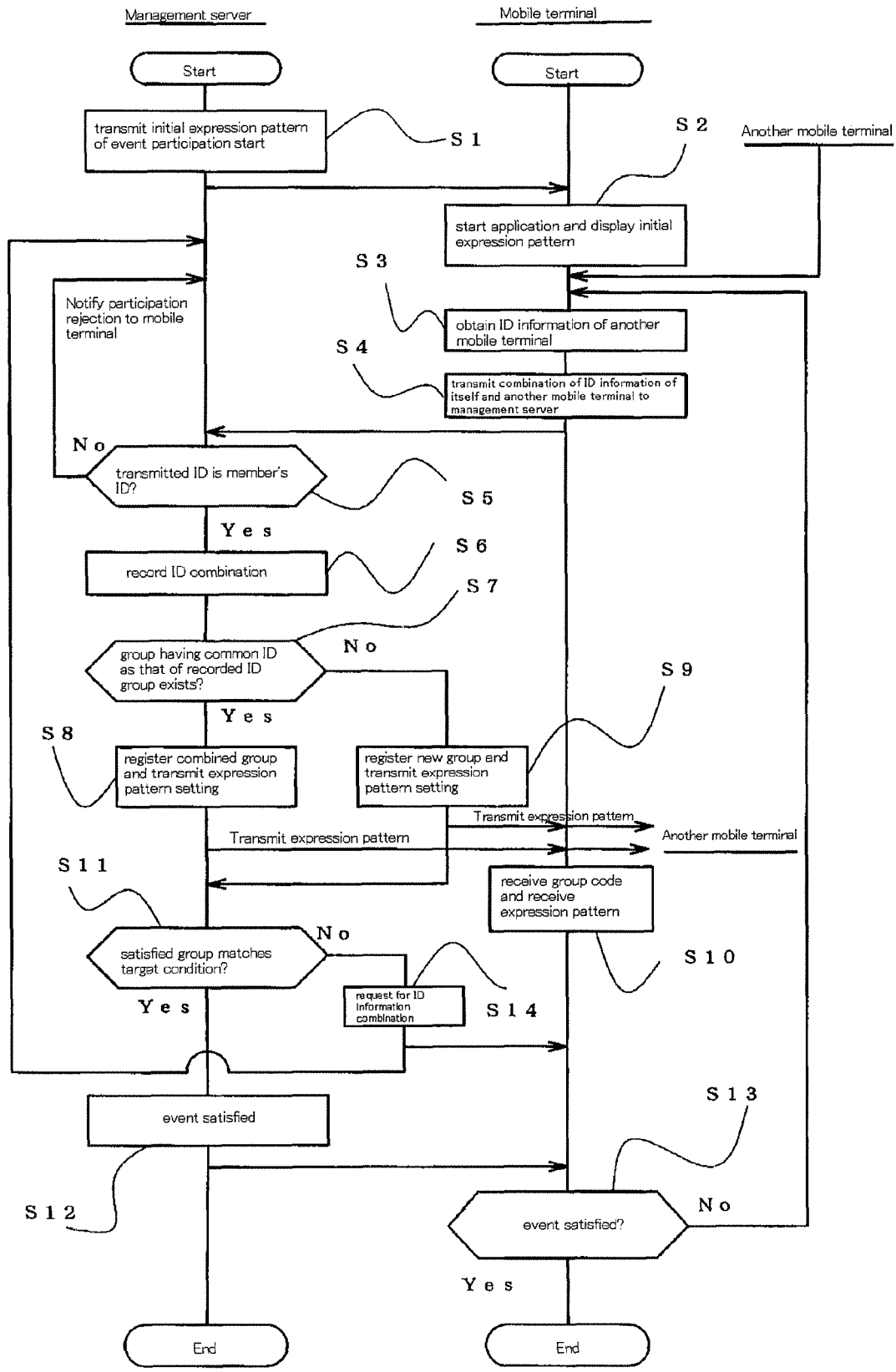
FIG. 5 is a flowchart showing operations of the grouping system.
Figure 6:
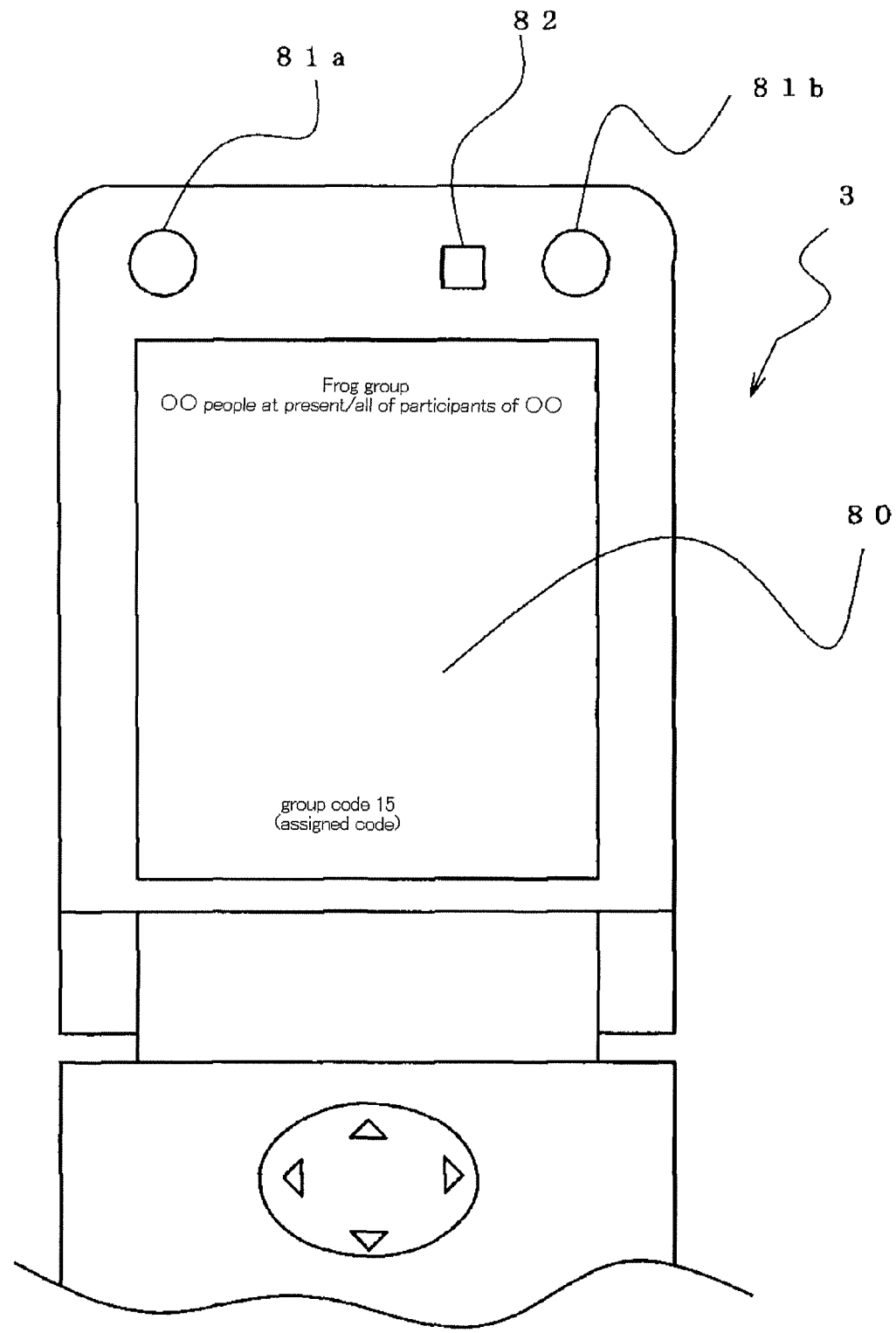
FIG. 6 is a display screen diagram of a mobile terminal.

FIG. 1 is a general configuration diagram of a grouping system according to an embodiment of the present invention. FIG. 2 is a schematic configuration diagram of a mobile terminal. FIG. 3A is a perspective view of a display screen device. FIG. 3B is a schematic configuration diagram of the display screen device. FIG. 4 is a schematic configuration diagram of a grouping management server. FIG. 5 is a flowchart showing operations of the grouping system. FIG. 6 is a display screen diagram of a mobile terminal. FIG. 7A is a diagram of a list of members' personal information databases. FIG. 7B is a diagram of a list of event management databases. FIG. 8A is a diagram of a list of expression pattern databases. FIG. 8B is a diagram of a list of ID group management databases.

FIG. 1 shows an example of a schematic configuration. The grouping system mainly has a grouping management server 1, an organizer's terminal 2 for instructing the grouping management server 1 to start grouping and the like, mobile terminals 3 (3a, 3b, ..., and 3n) carried by participants participating in an event where grouping is performed, and display screen devices 4 (4a, 4b, ..., and 4n) dangling from the necks of the participants.

The grouping management server 1 and the organizer's terminal 2 may be directly coupled to each other via a cable or the like.

Between the mobile terminal 3 and the grouping management server 1, for example, as shown in the diagram, an information transmission/reception path is formed by radio extending from the mobile terminal 3 to the grouping management server 1 via a base station 5, a cellular phone line network 6, a gateway 7, and the Internet 8.

The display screen devices 4 (4a, 4b, ..., and 4b) receive information of screen display and the like by radio from the corresponding mobile terminals 3 (3a, 3b, ..., and 3n). Specifically, between the display screen device 4 and the mobile terminal 3 carried by the same participant, the display screen device 4 receives information such as screen display by radio from the mobile terminal 3.

Next, an example of a schematic configuration of the mobile terminal 3 will be described with reference to FIG. 2.

The mobile terminal 3 is carried by each of the event participants. In the embodiment of the diagram, it is assumed that all of the mobile terminals 3 have the same functions.

The mobile terminal 3 (generically called mobile terminal 3 but properly individually called like mobile terminal 3a) has, in the embodiment shown in the diagram, terminal transmitting/receiving means 10 for performing radio communication with the base station 5, display means 12 for displaying characters and images, light emitting means 13 for notifying of an incoming call or the like, sound generating means 16 for generating sound, adjacent terminal communicating means 17 for transmitting/receiving information to/from an adjacent terminal, terminal recording means 18 as a memory device, and control means for controlling the means. Those means are connected to each other via a bus 19.

The mobile terminal 3 having an Internet connecting function or public line connecting function corresponds to a cellular phone, a PDA, or the like and is provided with the adjacent terminal communicating means 17.

To the adjacent terminal communicating means 17, an infrared transmitting/receiving device for transmitting/receiving information by infrared rays or an information communicating device for transmitting/receiving RFIDs, using a two-dimensional bar code or the like and a reader of the code or the like corresponds.

To the light emitting means 13 and the sound generating means 15, a lamp, a speaker, and the like for notifying of an incoming call in a cellular phone or the like correspond.

With reference to FIGS. 3A and 3B, the display screen devices 4 (4a, 4b, and 4n) will be described. The display screen device 4 shown as an example in FIG. 3A is a thin rectangular-parallelepiped plate member 21 to which a string 22 to be put on the neck is attached. When used, the display screen device 4 is hung from the neck. In one surface of the plate member 21, a liquid crystal display screen 23, a light emission lamp 25, and a speaker 26 are provided. Display on the screen, light emission, and generated sound in expression patterns similar to those of the mobile terminal 3 held by the event participant are generated.

Consequently, in the embodiment shown in the diagram, the display screen device 4 can receive, by radio, expression pattern information received by the mobile terminal 3 held by the event participant from the mobile terminal 3. The display screen device 4 and the mobile terminal 3 may transmit information by wired communication in place of the radio communication.

FIG. 3B is a diagram showing an example of a schematic configuration of the display screen device 4.

In the embodiment shown in the diagram, the display screen device 4 which can be hung from the body of a participant has receiving means 31 for receiving information from the mobile terminal 3 carried by the participant by radio communication, display means 33 for displaying characters and images in expression patterns as received information on the display screen 23, light generating means 35 for generating light in the expression pattern by the light emission lamp 25, sound generating means 36 for generating sound in the expression pattern by the speaker 26, control means 32 for controlling those means, and a power source 37. The means are connected to each other via a bus 37.

FIG. 4 is a diagram showing an example of a schematic configuration of the grouping management server 1 and the organizer's terminal 2.

The grouping management server 1 has various databases as recording means. In the embodiment shown in the diagram, the various databases include a members' personal information database 51 for recording member ID information of participants of an event, an ID information combination database 52 for recording a combination of ID information obtained by one mobile terminal from another mobile terminal by the adjacent terminal communicating means and ID information of the one mobile terminal, an event management database 53 for recording content of at least one event which is held, an ID group management database 55 for registering an ID group formed on the basis of the combination of the ID information, an expression pattern database 56 for recording expression pattern information displayed at least on the screen of the mobile terminal, and a control element database 57 for recording various control elements for generating a program for making the grouping management server 1 execute grouping processes.

In the embodiment shown in the diagram, the grouping management server 1 has management server transmitting/receiving means 61 connected to the Internet and carriers and for transmitting/receiving information, a management server I/F (interface) 62 for connection to the organizer's terminal 2, time information generating means 65 for generating event holding time information, controlling expression generating means 66 for generating a controlling expression as a process program from each of the various control elements recorded in the control element database 57, grouping managing means 67, and control means 63 for controlling the means. The means and the databases transmit/receive information via a bus 68.

The grouping managing means 67 performs an operation of forming an ID group (for example, linking a plurality of participants into one group, dividing a plurality of people into a plurality of groups, and grouping a plurality of participants by giving an attribute to a belonging ID) by linking a combination of ID information having common ID information recorded in the ID information combination database 52 from combinations of ID information transmitted from the mobile terminals 3 carried by the participants (for example, forming a group having common ID information by coupling combinations having common ID information or performing control in accordance with group forming conditions). That is, the grouping managing means 67 performs a process of expansively forming an ID group from combinations of ID information transmitted from the mobile terminals 3 carried by the participants.

Each time an ID group is formed by linking a combination of common ID information recorded in the ID information combination database 52, the group managing means 67 registers information related to the formed ID group into the ID group management database 55 in association with the formation time (for example, lapse time since event start time), and updates information related to the process of forming the same ID group (for example, update history information is registered in the ID group management database 55 by the operation performed by the group managing means 67, the update history information showing that an ID group made of member IDs 100, 159, and 160 after a lapse of 10 minutes since event start time is expanded to an ID group of member IDs 100, 159, 160, 203, 247, and 289 after a lapse of 15 minutes since the event start time, and the ID group is divided to an ID group of the member IDs 100, 203, 247, and 289 and an ID group of the member IDs 159, 160, 59, 62, and 304 after a lapse of 25 minutes since event start time).

The group managing means 67 associates formation of an ID group in association with formation time (for example, lapse time since event start time) and, each time the information regarding the formed ID group is registered in the ID group management database 55, the group managing means 67 transmits the expression pattern information to the mobile terminals 3 of participants belonging to the ID group.

In response to an instruction preliminarily assembled in the grouping computer program or a request from a terminal which accesses the grouping management server 1 via a network or the like such as the organizer's terminal 2, every predetermined time, the group managing means 67 performs an operation of outputting predetermined information registered in the ID group management database 55, such as information of an ID group (information of the number of people per ID group, the number of ID groups, attributes such as sex of people belonging to each of the ID groups, and the like), information on attributes of participants in an ID groups, information on history of formation of an ID group with lapse of time since event start time, and information on attributes of events accompanying the information related to the ID groups.

The information output from the ID group management database 55 by the operation performed by the group managing means 67 can be provided as electronic information to the other.

The event start time information may be generated not only at times which are preliminarily determined on the database but also in response to an instruction from the organizer's terminal 2 or a start request input from the mobile terminal 3 of a prospective participate.

As the grouping management server 1, a dedicated device may be used. Alternatively, by combining a peripheral device such as a modem to a personal computer, a workstation, and the like as general devices and operating a predetermined program, the functions of the means can be displayed. In this case, an external storage device such as a hard disk corresponds to each of the databases, and a CPU, a RAM, and the like corresponds to the control means 63, the controlling expression generating means 66, the group managing means 67, and the like.

In the embodiment shown in the diagram, the organizer's terminal 2 has input means 71 for inputting various instructions and information of registry/change to databases, display means 72 for displaying input information and reception information on the screen, an organizer's terminal I/F (interface) 73 as connecting means for transmitting/receiving information to/from the grouping management server 1, and organizer's terminal control means 74 for controlling those means. The means is connected via a bus 75 to transmit/receive information to/from each other. To the organizer's terminal 2, a personal computer, a PDA, and the like as general devices correspond.

The operation performed by the grouping system will be described with reference to the flowchart of FIG. 5.

The grouping management server (also simply called "management server") 1 transmits an initial expression pattern of event participation start to the mobile terminal 3 (3a, 3b, . . . , and 3n) carried by an event participant (S1).

The transmission can be performed on receipt of a start instruction from the input means of the organizer's terminal 2. The initial expression pattern indicative of the event participation start is used to transmit an expression file of a controlling expression for requiring participation of a specific event.

The mobile terminal 3 carried by a participant starts an application for executing the system and displays the received initial expression pattern (S2).

To a prospective participant whose contact and data communication address are preliminarily registered in a participant list by communication on the Internet or other means, a dedicated mobile terminal 3 and a dedicated display screen device 4 are sent in advance. Alternatively, an application for providing a general mobile terminal 3 with the functions similar to those of the dedicated terminal is downloaded from a server connected to the Internet or the like of a person providing the grouping system (for example, an event organizer) such as the grouping management server 1 or the like. Member IDs are allocated and registered in the participant list.

In the case where a person existing in a site desires to participate in an event after the event starts, who already has participated in another event and received a dedicated terminal (dedicated mobile terminal 3) of the system, or a system application has been already downloaded to a general mobile terminal 3 of a person already participated in another event, the participant registered in a participant list is retrieved. One mobile terminal 3a (dedicated mobile terminal of the system carried by a person who wishes to participate in the event or a general mobile terminal to which the system application has already been downloaded) obtains ID information (member ID) from the another mobile terminal 3b (a dedicated mobile terminal of the system and carried by a participant registered in the participant list or a general mobile terminal to which the system application has been already downloaded) (S3).

The ID information (member ID) is registered in each of the participants and recorded in a memory as the terminal recording means 18 of the mobile terminal 3 carried. ID information (member ID) is obtained by communication by an infrared device as the adjacent terminal communicating means 17 of the mobile terminal 3.

In the case where there is a person who has a general mobile terminal and wishes to participate in a group but has not downloaded the application yet, if the function of exchanging the data communication destinations by the adjacent terminal communicating means 17 exists, the data communication destinations are exchanged. If there is no such a function, the application is downloaded by retrieving the URL or the like, and a member ID is assigned.

For example, the dedicated mobile terminal 3 of the system carried by a participant registered in a participant list or a general mobile terminal 3 to which the system application has already been downloaded performs communication via the adjacent terminal communicating means 17 with a general mobile terminal of a person (another person) who carries the general mobile terminal and has not downloaded the application, and obtains information of the data communication destination (for example, telephone number, mail address, and the like of the mobile terminal of the another person).

The dedicated mobile terminal 3 of the system carried by a participant registered in a participant list or a general mobile terminal 3 to which the system application has already been downloaded has the functions of performing: a process operation of determining, in response to an instruction of the system application (computer program), on the basis of the information obtained from the mobile terminal carried by the another person, whether or not the mobile terminal carried by the another person is a mobile terminal storing the system application in a storage (for example, the terminal recording means 18 as a memory device) of the mobile terminal (for example, a mobile terminal to which the system application is downloaded, or a commercially-available mobile terminal in which the system application is stored in the terminal recording means 18); and a process operation, when the mobile terminal carried by the another person is determined as a mobile terminal which does not store the system application in the terminal recording means 18, of transmitting the information of the data destination of the mobile terminal of the person who wishes to participates in the group from the dedicated mobile terminal 3 carried by the participant registered in the participant list to the grouping management server 1.

Consequently, the grouping management server 1 can download the application to the mobile terminal of the person who wishes to participate in the group on the basis of the information of the data communication destination of the mobile terminal of the person who wishes to participate in the group, and assign a member ID.

In this case, by a program included in the grouping program, a process operation part of the grouping management server 1 performs a process operation of, when the information of the data communication destination of the mobile terminal of the person (the other person) who wishes to participate in the group (for example, the telephone number and the mail address of the mobile terminal of the other person) is obtained from the mobile terminal 3, downloading the system application to the mobile terminal of the person who wishes to participate in the group and assigning a member ID on the basis of the information of the data communication destination of the mobile terminal of the person who wishes to participate in the group.

The dedicated mobile terminal 3 of the system carried by a participant registered in the participant list or a general mobile terminal 3 to which the system application has already been downloaded performs a communication with a general mobile terminal of the person who has a general mobile terminal and wishes to participate in the group, to which the application has not been downloaded, via the adjacent terminal communicating means 17, and obtains any of the mobile terminal device ID of the mobile terminal of the person (the another person) who wishes to participate in the group, an ID of the adjacent communicating means device (for example, a chip ID), a user ID, and a contractor ID.

The dedicated mobile terminal 3 of the system carried by a participant registered in the participant list or a general mobile terminal 3 to which the system application has already been downloaded has the function of performing: a process operation of determining, in response to an instruction of the system application (computer program), on the basis of the information obtained from the mobile terminal carried by the another person, whether or not the mobile terminal carried by the another person is a mobile terminal that stores a system application in a storage (for example, the terminal recording means 18 as a memory device) of the mobile terminal (for example, a mobile terminal to which the system application is downloaded or a commercially-available mobile terminal in which the system application is stored in the terminal recording means 18); and a process operation, when the mobile terminal carried by the another person is determined as a mobile terminal in which the system application is not stored in the terminal recording means 18, of transmitting any of the mobile terminal device ID of the mobile terminal of the person (another person) obtained, the ID of the adjacent communicating means (for example, the chip ID or the like), the user ID, and the contractor ID from the dedicated mobile terminal 3 of the system carried by the participant registered in the participant list to the grouping management server 1.

The grouping management server 1 can access an ID management server for managing the mobile terminal device ID, the ID of the adjacent communicating means device, the user ID, or the contractor ID via a network on the basis of any of the mobile terminal device ID, the ID of the adjacent communicating means device, the user ID and the contractor ID obtained. The ID management server is, for example, a server device for managing the mobile terminal device ID, the ID of the adjacent communication means device, the user ID and the contractor ID by an ID management database, such as a server device for managing the mobile terminal of the person (another person) who wishes to participate in the group like a server device of a portable carrier, a server device of an IC chip addition value service company, a public Ucode management server device, and a management server device of an adjacent communicating device provided for the mobile terminal of the person (another person) who wishes to participate in the group. The grouping management server 1 obtains information of a data communication destination of the mobile terminal (for example, the telephone number and the mail address of the mobile terminal of the person (another person) who wishes to participate in the group) specified by any of the mobile terminal device ID, the ID of the adjacent communicating means device, the user ID, and the contract ID obtained. On the basis of the information related to the data communication destination, the grouping management server 1 downloads the system application to the mobile terminal of the person (another person) who wishes to participate in the group, and assigns a member ID.

In this case, by a program included in the grouping program, a process operation part of the grouping management server 1 performs a process operation of, when any of the mobile terminal device ID of the mobile terminal of the person (another person) who wishes to participate in the group, the ID of the adjacent communicating means device, the user ID, and the contractor ID is obtained from the mobile terminal 3, accessing, via a network, an ID management server for managing the mobile terminal device ID, the ID of the adjacent communicating means device, the user ID, or the contractor ID in an ID management database on the basis of any of the mobile terminal device ID, the ID of the adjacent communicating means device, the user ID and the contractor ID obtained. The ID management server is, for example, a server device for managing the mobile terminal device ID, the ID of the adjacent communication means device, the user ID and the contractor ID by an ID management database, such as a server device for managing the mobile terminal of the person (another person) who wishes to participate in the group like a server device of a portable carrier, a server device of an IC chip addition value service company, a public Ucode management server device, and a management server device of an adjacent communicating device provided for the mobile terminal of the person (another person) who wishes to participate in the group. The grouping management server 1 obtains information of a data communication destination of the mobile terminal (for example, the telephone number, mail address and the like of the mobile terminal of the person (another person) who wishes to participate in the group) specified by any of the mobile terminal device ID, the ID of the adjacent communicating means device, the user ID, and the contract ID obtained. The grouping management server 1 downloads the system application to the mobile terminal of the person (another person) who wishes to participate in the group on the basis of the information related to the data communication destination, and assigns a member ID.

Further, in response to an instruction of a system application (computer program), the dedicated mobile terminal 3 of the system or a general mobile terminal 3 to which the system application has already been downloaded can perform: at the time of performing communication with a mobile terminal carried by another person via the adjacent terminal communicating means 17, a process operation of determining whether the mobile terminal carried by the another person is a mobile terminal storing the system application in its storage (for example, the terminal recording means 18 as a memory device) or not on the basis of the information obtained from the mobile terminal carried by the another person. The mobile terminal is, for example, a mobile terminal to which the system application is downloaded or a commercially-available mobile terminal in which the system application is stored in the terminal recording means 18. The mobile terminal 3 can perform: a process operation of determining whether the mobile terminal carried by the another person is a general mobile terminal to which a member ID is assigned or not; and, when it is determined that the mobile terminal carried by the another person is a mobile terminal which stores the system application in its terminal recording means 18 but to which no member ID is assigned, a process operation of transmitting information for starting the system application to the mobile terminal carried by the another person via the adjacent terminal communicating means 17.

It is assumed here that member IDs are IDs assigned to participants of the event. In the case of managing a plurality of events, IDs may be assigned to all of terminals each having a dedicated device or to which the application is downloaded, and registered in a participant list.

The mobile terminal 3a which has obtained the ID information (member ID) from the mobile terminal 3b transmits a combination of the ID information and ID information (member ID) of itself to the management server (S4).

The combination of the ID information can be transmitted to the management server 1 each time the mobile terminal 3 obtains ID information of a mobile terminal of another person. The transmission and the like can be performed by a control instruction by start of the system application.

When the mobile terminal 3 carried by a participant obtains ID information (member IDs) simultaneously from two or more mobile terminals of other persons, a process can be performed on assumption that a plurality of ID information pieces (member IDs) are simultaneously exchanged, and a combination of ID information (member IDs) obtained simultaneously from two or more mobile terminals of other persons and the ID information of the mobile terminal 3 may be transmitted as a combination of three or more ID information pieces (member IDs) to the grouping management server 1. Alternatively, in such a case, as a process operation performed by a process operating unit of the mobile terminal 3 carried by a single participant, the ID information can be paired (a pair of ID information (member ID) obtained from another mobile terminal and ID information of the mobile terminal 3) and transmitted sequentially in some order to the grouping management server 1. Such a process operation can be also performed in response to an instruction of a controlling expression upon start of the application.

The group managing means 67 of the management server 1 determines whether each of the member IDs in the received combination of the ID information (member IDs) is a member ID of a registered member or not by retrieving the members' personal information database 51 (S5). When the ID information (member ID) is not registered, the group managing means 67 transmits a notification of participation rejection to the mobile terminal 3 which has transmitted the ID information combination.

When the two member IDs in the pair of ID information (member IDs) are registered ones, the pair of ID information (member IDs) is registered in the ID information combination database 52 (S6).

The group managing means 67 performs a process operation of forming an ID group (for example, a plurality of participants are grouped by combining a plurality of participants to one group, dividing a plurality of participants into a plurality of groups, and giving attributes to belonging IDs) by linking ID information combinations transmitted from mobile terminals 3 carried by the participants and having common ID information in the ID information combinations recorded in the ID information combination database 52 (for example, forming a group having common ID information by coupling combinations having common ID information or performing control in accordance with group forming conditions). That is, the group managing means 67 performs a process of expansively forming an ID group from combinations of the ID information transmitted from the mobile terminals 3 carried by the participants.

For example, with respect to a combination of ID information (member IDs) recorded in the ID information combination database 52, whether it has the ID information (member ID) common to that of another combination of the ID information (member IDs) or not is determined (S7). When a combination has common ID information (member IDs), the combinations are connected and combined to an ID group. When the ID group has ID information common to that of another ID group, the ID groups are connected and combined to a new ID group.

When a new ID group is formed by the combining operation, it is registered in the ID group management database 55.

To make the fact known to the others, a new expression pattern is determined for the new ID group, and is transmitted to the mobile terminal 3 belonging to the ID group (58).

After the combination of ID information (member IDs) is registered in the ID information combination database 52, when there is no other ID information combination or ID group having common ID information, the set of ID information (member IDs) is registered as an ID group in the ID group management database 55. A new expression pattern is set and transmitted to the two mobile terminals in the ID group (S9).

Each time an ID group is formed by linking ID information combinations recorded in the ID information combination database 52 and having common ID information, the group managing means 67 registers information of the formed ID group into the ID group management database 55 so as to be associated with formation time of the ID group (for example, lapse time since the event start time), and updates information on a process of forming the same ID group (for example, update history information is registered into the ID group management database 55 by the process operation performed by the group managing means 67, the update history information such that an ID group made of member IDs 100, 159, and 160 at lapse of 10 minutes since event start time is enlarged to an ID group made of member IDs 100, 159, 160, 203, 247, and 289 at lapse of 15 minutes since event start time, and divided into an ID group made of member IDs 100, 203, 247, and 289 and an ID group made of member IDs 159, 160, 59, 62, and 304 at lapse of 25 minutes since event start time).

A list of information recorded in the databases of the management server 1 will be described with reference to FIGS. 7A and 7B and FIGS. 8A and 8B.

FIG. 7A shows a members' personal information database list in which attribute information such as a member ID as ID information (member ID) of a participant, member's name, cellular phone number, and sex is recorded. FIG. 7B shows an event management database in which events to be held are recorded. An event code, an event name, start date and time, and IDs (member IDs) of prospective participants of each event are recorded.

FIG. 8A shows an expression pattern database list in which, to identify an ID group to be formed, a screen display, a light emission pattern, a sound generation pattern, and the like are recorded so as to be distinguished by an expression pattern code. FIG. 8B shows an ID group management database in which an ID group formed for each event is written together with an ID list, an expression pattern code, and an allocation code as an identification code of the ID group. FIG. 8B shows ID groups participating in an event having an event code IV2245 as a part of the ID group management database.

FIG. 6 is a display screen diagram for explaining outline of an expression pattern displayed on a mobile terminal carried by an event participant. Each time an ID group is newly formed or ID groups are combined to a new ID group, the expression pattern changes. The expression pattern shows an expression pattern code P0002 in the expression pattern database list. On a screen 80, characters "frog group", the number of members in the frog group, and the number of all of participants are written. Light is generated according to a light pattern file in light emission lamps 81a and 81b, and melody of a song "wanted" which is preset in the sound generation file is generated from a speaker 82.

Referring again to the flowchart of FIG. 5, by receiving the expression pattern as described above, the mobile terminal 3 identifies an ID group by the characters, an image, light, and sound (S10).

Whether a generated ID group is a preset target ID group or not is determined by the group managing means 67 (S11).

The determination is made to perform grouping in accordance with an allocation controlling expression of a program instructing formation of a group.

Specifically, when a group of a predetermined number of participants is set in advance, the ID group formation is stopped when the number of people in the group reaches the predetermined number, and an event starts (S12). A message indicative of completion of the grouping and formation of an event is transmitted to each of the mobile terminals 3 (S13). The mobile terminals 3 stop combining ID information.

When the number of target groups and the number of people in the group do not reach the target number of groups, transmission of combinations of ID information from the mobile terminals is accepted, and an ID group is formed expansively (S14).

As described above, in the grouping system, by obtaining ID information using the adjacent terminal communicating means in the mobile terminals carried by event participants and transmitting the combination of the ID information to the grouping management server, the forming ID group by linking the participants having common information can be made. The grouping with respect for intentions of the participants can be also made. Since an expression pattern is transmitted to mobile terminals at each of stages in which an ID group is formed, participants can recognize the group formation in a real-time manner.

In response to an instruction preliminarily assembled in the grouping computer program or a request from a terminal which accesses the grouping management server 1 via a network or the like such as the organizer's terminal 2, every predetermined time, the group managing means 67 performs a process operation of outputting predetermined information registered in the ID group management database 55, such as information of an ID group (information of the number of people per ID group, the number of ID groups, attributes such as sex of people belonging to each of the ID groups, and the like), information on attributes of participants in an ID group, information on history of formation of an ID group with lapse of time since event start time, and information on attributes of events accompanying the information related to the ID groups.

The information output from the ID group management database 55 by the process operation performed by the group managing means 67 can be provided as electronic information to the other.

The processes in the management server 1, the organizer's terminal 2, the mobile terminals 3 (3a, 3b, . . . , and 3n) and the display screen devices 4 (4a, 4b, . . . , and 4n) in the foregoing embodiment are executed by the grouping program. The grouping program is in the form of a controlling expression as a combination of various control elements.

Specifically, the grouping program is made by controlling expressions and components of the expressions for designating operations of a program and a database, which are allocated to groups on the database under predetermined conditions. The grouping program can be used as a special programming language. The behavior of human population can be managed while considerably respecting autonomy of members. Further, there is much convenience that the behavior of human population can be managed only by control input to a series of databases. By adding a control element, controllable group behavior can be easily provided to the user.

An assigned code and a group on a database are basically unique at a certain time. To seek efficiency in processes and inputs on a database, as long as there is no problem on control, the same code may be assigned to a plurality of groups.

A controlling expression is associated with a series of group codes and stored in the control element database 57. The controlling expression is divided into a format specifier for determining which element in a controlling expression is executed or applied, an assignment control element for assigning a controlling expression to an autonomously generated group in accordance with a predetermined rule, a control execution element for performing coupling, splitting and breakup, and giving and taking an attribute (including generation in a behavior unit) in accordance with other predetermined conditions and entry of a behavior unit, a coupling control element for controlling coupling of groups (in particular, according to entry of a coupling instruction in the behavior unit), and a state management element for managing predetermined conditions and inputs. The control execution element also includes coalition with other software and control on detailed behavior of the system based on a request on a concrete system.

Those control elements are shown in the form of lists in FIGS. 9 to 16. FIGS. 17 to 24 show assignment controlling expressions for instructing grouping in each of events, as controlling expressions using the above-described control elements.

Although the preferred embodiments have been described above with reference to the attached drawings, the present invention is not limited to the embodiments but can be variously modified within the technical scope grasped from the scope of claims.

DESCRIPTION OF REFERENCE NUMERALS

1 (grouping) management server
2 organizer's terminal
3 (3a, 3b, . . . , 3n) mobile terminals
4 (4a, 4b, . . . , 4n) display screen devices
17 adjacent terminal transmitting means
51 members' personal information DB
52 ID information combination DB
53 event management DB
55 ID group management DB
56 expression pattern DB
67 group managing means

The invention claimed is:

1. A grouping system for grouping a plurality of participants participating in an event, comprising:
 a mobile terminal carried by each of the participants, the mobile terminal having adjacent terminal communicating means for directly transmitting/receiving information including information to/from an other mobile terminal; and
 a grouping management server for grouping the participants by transmitting/receiving information to/from the mobile terminals,
 wherein the grouping management server includes:
 a member personal information database for recording ID information of the participants;
 an ID information combination database for receiving and recording a combination of ID information obtained by one mobile terminal directly from another one or more mobile terminals by the adjacent terminal communicating means and ID information from the one mobile terminal transmitted by the one mobile terminal;
 an event management database for recording content of at least one event;
 an ID group management database for registering an ID group formed on the basis of the combination of the ID information;
 management server transmitting/receiving means for transmitting/receiving information to/from the mobile terminal;
 group managing means for forming the ID group by linking ID information combinations having common ID information, recorded in the ID information combination database; and
 control means for controlling the databases and the means, and
 the group managing means forms the ID group as an event participation group on the basis of a preset group forming condition, and wherein;
 the mobile terminal for obtaining ID information from another one or more of the mobile terminals by adjacent terminal communicating means has the functions of performing:
 a process operation of obtaining information of data destinations of mobile terminals from the another one or more of the mobile terminals via the adjacent terminal communicating means, and determining, on the basis of the information obtained from the another one or more of the mobile terminals, whether the mobile terminal has a system application for participating in the grouping system in a storage of the mobile terminal or not, and
 a process operation, when the mobile terminal is determined as a mobile terminal which does not store the application in its storage, of transmitting the information of the data destination of the mobile terminal obtained to the grouping management server, and
 the grouping management server has the function of performing a process operation of, when the information of the data communication destination of the mobile terminal is obtained from one mobile terminal, downloading the application to the mobile terminal and assigning a member ID on the basis of the information of the data communication destination.

2. The grouping system according to claim 1, wherein the grouping management server further comprises an expression pattern database for recording expression pattern information displayed at least on a screen of the mobile terminal, wherein each time a new ID group is formed by linking ID information combinations or ID groups having the common ID information, the group managing means transmits predetermined expression pattern information extracted from the expression pattern database to the mobile terminals of the participants belonging to the new ID group.

3. The grouping system according to claim 2, further comprising, as an event participant carrying item, a display screen device for receiving and displaying the expression pattern information,
 wherein the display screen device displays the same expression pattern as that displayed on the mobile terminal each time a new ID group is formed.

4. The grouping system according to claim 1, further comprising an organizer terminal for inputting a participant grouping instruction for each event to the grouping management server.

5. A grouping system for grouping a plurality of participants participating in an event, comprising:
 a mobile terminal carried by each of the participants, the mobile terminal having adjacent terminal communicating means for directly transmitting/receiving information including information to/from an other mobile terminal; and a grouping management server for grouping the participants by transmitting/receiving information to/from the mobile terminals, wherein the grouping management server includes:

a member personal information database for recording ID information of the participants;

an ID information combination database for receiving and recording a combination of ID information obtained by one mobile terminal directly from another one or more mobile terminals by the adjacent terminal communicating means and ID information from the one mobile terminal transmitted by the one mobile terminal;

an event management database for recording content of at least one event;

an ID group management database for registering an ID group formed on the basis of the combination of the ID information;

management server transmitting/receiving means for transmitting/receiving information to/from the mobile terminal;

group managing means for forming the ID group by linking ID information combinations having common ID information, recorded in the ID information combination database; and control means for controlling the databases and the means, and the group managing means forms the ID group as an event participation group on the basis of a preset group forming condition, and wherein;

the one mobile terminal for obtaining ID information from the another one or more mobile terminals by the adjacent terminal communicating means has the function of performing:

a process operation of obtaining any of a mobile terminal device ID of the another one or more mobile terminals, an ID of the adjacent communicating means device, a user ID, and a contractor ID from the another one or more mobile terminals via the adjacent terminal communicating means, and determining, on the basis of the information obtained from the another one or more mobile terminals, whether the mobile terminal stores a system application for participating in the grouping system in a storage of the mobile terminal or not, and a process operation, when the mobile terminal is determined as a mobile terminal having no application in its storage, of transmitting any of the mobile terminal device ID of the mobile terminal, the ID of the adjacent communicating means device, the user ID, and the contractor ID obtained to the grouping management server, and the grouping management server has the function of performing a process operation of, when any of the mobile terminal device ID of the another one or more mobile terminals, the ID of the adjacent communicating means device, the user ID, and the contractor ID is obtained from the one mobile terminal, accessing an ID management server for managing the mobile terminal device ID, the ID of the adjacent communicating means device, the user ID, or the contractor ID in an ID management database on the basis of any of the mobile terminal device ID, the ID of the adjacent communicating means device, the user ID and the contractor ID obtained, obtaining information of a data communication destination of the mobile terminal specified by any of the mobile terminal device ID, the ID of the adjacent communicating means device, the user ID, and the contract ID obtained, downloading the application to the mobile terminal on the basis of the information related to the data communication destination, and assigning a member ID.

6. The grouping system according to claim 5, wherein the grouping management server further comprises an expression pattern database for recording expression pattern information displayed at least on a screen of the mobile terminal, wherein each time a new ID group is formed by linking ID information combinations or ID groups having the common ID information, the group managing means transmits predetermined expression pattern information extracted from the expression pattern database to the mobile terminals of the participants belonging to the new ID group.

7. The grouping system according to claim 6, further comprising, as an event participant carrying item, a display screen device for receiving and displaying the expression pattern information, wherein the display screen device displays the same expression pattern as that displayed on the mobile terminal each time a new ID group is formed.

8. The grouping system according to claim 5, further comprising an organizer terminal for inputting a participant grouping instruction for each event to the grouping management server.

9. A grouping system for grouping a plurality of participants participating in an event, comprising:

a mobile terminal carried by each of the participants, the mobile terminal having adjacent terminal communicating means for directly transmitting/receiving information including information to/from an other mobile terminal; and a grouping management server for grouping the participants by transmitting/receiving information to/from the mobile terminals, wherein the grouping management server includes:

a member personal information database for recording ID information of the participants;

an ID information combination database for receiving and recording a combination of ID information obtained by one mobile terminal directly from another one or more mobile terminals by the adjacent terminal communicating means and ID information from the one mobile terminal transmitted by the one mobile terminal;

an event management database for recording content of at least one event;

an ID group management database for registering an ID group formed on the basis of the combination of the ID information;

management server transmitting/receiving means for transmitting/receiving information to/from the mobile terminal;

group managing means for forming the ID group by linking ID information combinations having common ID information, recorded in the ID information combination database; and control means for controlling the databases and the means, and the group managing means forms the ID group as an event participation group on the basis of a preset group forming condition, and wherein;

the one mobile terminal for obtaining ID information from the another one or more mobile terminals by the adjacent terminal communicating means has the function of performing a process operation of determining whether the mobile terminal is a mobile terminal having a system application for participating in the grouping system in a storage of the mobile terminal or not on the basis of information obtained from the mobile terminal when communication is performed with the another one or more mobile terminals via the adjacent terminal communicating means,
- a process operation of determining whether the mobile terminal is a mobile terminal to which a member ID is assigned or not, and
- a process operation of transmitting information for starting the application to the mobile terminal via the adjacent terminal communicating means when the mobile terminal is determined as a mobile terminal which stores the application in its storage but to which no member ID is assigned.

10. The grouping system according to claim 9, wherein the grouping management server further comprises an expression pattern database for recording expression pattern information displayed at least on a screen of the mobile terminal, wherein each time a new ID group is formed by linking ID information combinations or ID groups having the common ID information, the group managing means transmits predetermined expression pattern information extracted from the expression pattern database to the mobile terminals of the participants belonging to the new ID group.

11. The grouping system according to claim 10, further comprising, as an event participant carrying item, a display screen device for receiving and displaying the expression pattern information,
wherein the display screen device displays the same expression pattern as that displayed on the mobile terminal each time a new ID group is formed.

12. The grouping system according to claim 9, further comprising an organizer terminal for inputting a participant grouping instruction for each event to the grouping management server.

* * * * *